US012764543B2

(12) United States Patent
Muhammad et al.

(10) Patent No.: US 12,764,543 B2
(45) Date of Patent: Oct. 13, 2026

(54) SYSTEMS AND METHODS FOR MACHINE LEARNED NETWORK ACTIVITY PROFILING OF DEVICES

(71) Applicant: TELEFONAKTIEBOLAGET LM ERICSSON (PUBL), Stockholm (SE)

(72) Inventors: Sayyed Auwn Muhammad, Täby (SE); Ikram Ullah, Thuwal (SA); Loay Abdelrazek, Danderyd (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 193 days.

(21) Appl. No.: 18/577,669

(22) PCT Filed: May 4, 2022

(86) PCT No.: PCT/IB2022/054129
§ 371 (c)(1),
(2) Date: Jan. 8, 2024

(87) PCT Pub. No.: WO2023/281323
PCT Pub. Date: Jan. 12, 2023

(65) Prior Publication Data

US 2024/0334193 A1 Oct. 3, 2024

Related U.S. Application Data

(60) Provisional application No. 63/203,087, filed on Jul. 7, 2021.

(51) Int. Cl.
*H04W 12/128* (2021.01)
*G06N 20/00* (2019.01)

(52) U.S. Cl.
CPC .......... *H04W 12/128* (2021.01); *G06N 20/00* (2019.01); *G06F 2221/034* (2013.01)

(58) Field of Classification Search
None
See application file for complete search history.

(56) References Cited

U.S. PATENT DOCUMENTS

2013/0294263 A1* 11/2013 Haga .................... H04L 43/065 370/252
2016/0352589 A1* 12/2016 Zhu ........................ H04L 43/04
(Continued)

FOREIGN PATENT DOCUMENTS

WO 2021131902 A1 7/2021

OTHER PUBLICATIONS

3GPP, "3rd Generation Partnership Project; Technical Specification Group Services and System Aspects; Architecture enhancements for 5G System (5GS) to support network data analytics services (Release 17)", 3GPP TS 23.288 V17.1.0, Jun. 2021.
(Continued)

*Primary Examiner* — Raqiul A Choudhury
(74) *Attorney, Agent, or Firm* — Rothwell, Figg, Ernst & Manbeck, P.C.

(57) ABSTRACT

A method is performed by a network node for training of machine-learned models for detection of abnormal User Equipment, UE, behavior. The method comprises obtaining training data comprising a plurality of interaction logs for a respective plurality of training UEs and clustering each of the interaction logs of the training data into one or more activity clusters with a machine-learned behavior analysis model to learn one or more activities associated with at least one of the one or more activity clusters.

18 Claims, 30 Drawing Sheets

(56) References Cited

U.S. PATENT DOCUMENTS

| | | | | |
|---|---|---|---|---|
| 2017/0214702 | A1 | 7/2017 | Moscovici et al. | |
| 2018/0255085 | A1* | 9/2018 | Kuperman | H04L 63/1425 |
| 2019/0036795 | A1 | 1/2019 | Ouyang et al. | |
| 2019/0260778 | A1* | 8/2019 | Chen | H04L 63/1425 |
| 2020/0187048 | A1 | 6/2020 | Mishra et al. | |
| 2021/0037061 | A1* | 2/2021 | Trost | H04L 63/1425 |
| 2023/0115046 | A1* | 4/2023 | Karta | H04L 63/1483 726/23 |

OTHER PUBLICATIONS

3GPP, "3rd Generation Partnership Project; Technical Specification Group Services and System Aspects; Study on security aspects and enablers for Network Automation(eNA) for the 5G system (5GS) Phase 2; (Release 17)", 3GPP TR 33.866 V0.5.0, May 2021.

Cavnar, "Using An N-Gram-Based Document Representation With A Vector Processing Retrieval Model", Conference Paper, ResearchGate, Jan. 1994.

Hall, "Detection of rogue devices in Wireless Networks", Ottawa-Carleton Institute for Computer Science School of Computer Science, Carleton University, Aug. 2006.

Li et al., "Behavior Profiling for Transparent Authentication for Mobile Devices", Conference Paper, ResearchGate, Jul. 2011, pp. 307-314.

Manning et al., "Foundations of Statistical Natural Language Processing", Foundations of Statistical Natural Language Processing, MIT Press. Cambridge, MA: May 1999.

O-RAN Alliance, "O-RAN Architecture Description", O-RAN.WG1. O-RAN-Architecture-Description-v03.00, Technical Specification, 2021.

Oka et al., "Anomaly Detection Using Integration Model of Vector Space and Network Representation", IPSJ Journal Regular Paper, vol. 48. No. 6, Jun. 2007, pp. 2118-2128.

* cited by examiner

| | pucch_cqi | dra_pdcch | pucch_AN | ul_ue_retx | pusch_AN | dra_pdsch_newtx | dra_tti_selected_se | dra_pusch_newtx_req | dra_pusch_newtx_alloc | pucch_ri | pucch_sr |
|---|---|---|---|---|---|---|---|---|---|---|---|
| pucch_cqi | 0.67 | 0.018 | 0.0022 | 0.0017 | 0 | 0.0046 | 0.028 | 0 | 0 | 0.3 | 0.019 |
| pucch_ri | 0.91 | 0.017 | 0.0021 | 0.0016 | 0 | 0.0047 | 0.028 | 0 | 0 | 0 | 0.019 |
| dra_tti_selected_sa | 0.0034 | 0.12 | 0 | 0.017 | 0 | 0.032 | 0.0011 | 0.083 | 0.083 | 0.0012 | 0 |
| dra_pdcch | 0.003 | 0 | 0.019 | 0.0014 | 0 | 0.039 | 0.0024 | 0.1 | 0.1 | 0 | 0 |
| ul_ue_received | 0.041 | 0.042 | 0 | 0 | 0 | 0 | 0.078 | 0 | 0 | 0.014 | 0.0021 |
| dra_pusch_newtx_req | 0.0061 | 0.0016 | 0.001 | 0 | 0 | 0 | 0.0022 | 0 | 0.14 | 0.0017 | 0 |
| handle_ul_harq_fb_trace | 0.075 | 0.049 | 0 | 0 | 0 | 0.021 | 0.081 | 0.021 | 0 | 0.024 | 0.01 |
| pucch_sr | 0 | 0.14 | 0 | 0 | 0 | 0 | 0.14 | 0.14 | 0 | 0 | 0 |
| build_phich_request_trace | 0.15 | 0.012 | 0.021 | 0.028 | 0 | 0.0072 | 0.034 | 0 | 0 | 0.047 | 0.014 |
| dra_pusch_newtx_alloc | 0.0063 | 0.0022 | 0.001 | 0 | 0 | 0 | 0.058 | 0.0013 | 0 | 0.0018 | 0 |
| pucch_AN | 0.074 | 0.04 | 0.0021 | 0 | 0 | 0.0012 | 0.052 | 0 | 0 | 0.025 | 0.049 |
| dra_pdsch_newtx | 0.023 | 0.0021 | 0.07 | 0 | 0 | 0 | 0.0039 | 0.0014 | 0 | 0.0068 | 0.025 |
| dl_ue_1tb_sched | 0.042 | 0.0022 | 0.078 | 0 | 0 | 0 | 0.028 | 0 | 0 | 0.014 | 0.042 |
| ul_ue_retx | 0 | 0 | 0 | 0 | 0 | 0 | 0.037 | 0 | 0 | 0 | 0 |
| dra_pusch_retx | 0.011 | 0 | 0 | 0.064 | 0 | 0 | 0.0018 | 0 | 0 | 0.0038 | 0.0018 |
| pusch_AN | 0 | 0.0045 | 0 | 0 | 0 | 0.0037 | 0.0072 | 0 | 0 | 0 | 0 |

FIG. 6

900

ECM 1

| | | | | | | | | | | | | | | | |
|---|---|---|---|---|---|---|---|---|---|---|---|---|---|---|---|
| 0 | 0.22 | 0 | 0 | 0 | 0 | 0.22 | 0.22 | 0 | 0 | 0 | 0 | 0 | 0 | 0 | 0 |
| 0.11 | 0.086 | 0 | 0 | 0 | 0.037 | 0.14 | 0.038 | 0 | 0.034 | 0.015 | 0 | 0 | 0.052 | 0.15 | 0 |
| 0.06 | 0.074 | 0 | 0 | 0 | 0 | 0.14 | 0 | 0 | 0.019 | 0 | 0 | 0 | 0.051 | 0.097 | 0.22 |
| 0.22 | 0.019 | 0.037 | 0.05 | 0 | 0.012 | 0.057 | 0 | 0 | 0.07 | 0.022 | 0 | 0.09 | 0 | 0 | 0.079 |
| 0.011 | 0 | 0 | 0 | 0 | 0 | 0 | 0 | 0.22 | 0 | 0 | 0 | 0.2 | 0 | 0.052 | 0.17 |
| 0.011 | 0 | 0 | 0 | 0 | 0 | 0.096 | 0 | 0 | 0 | 0 | 0 | 0.22 | 0 | 0.12 | 0.2 |
| 0 | 0.18 | 0 | 0.029 | 0 | 0.058 | 0 | 0.13 | 0.13 | 0 | 0 | 0.055 | 0 | 0.039 | 0.039 | 0 |
| 0 | 0 | 0.034 | 0 | 0 | 0.067 | 0 | 0.16 | 0.16 | 0 | 0 | 0.067 | 0.12 | 0 | 0.051 | 0 |
| 0.13 | 0.07 | 0 | 0 | 0 | 0 | 0.092 | 0 | 0 | 0.044 | 0.086 | 0 | 0 | 0 | 0 | 0 |
| 0.075 | 0 | 0.14 | 0 | 0 | 0 | 0.049 | 0 | 0 | 0.025 | 0.074 | 0 | 0 | 0 | 0.057 | 0 |
| 0.04 | 0 | 0.12 | 0 | 0 | 0 | 0 | 0 | 0 | 0.012 | 0.045 | 0.14 | 0 | 0 | 0.053 | 0 |
| 0 | 0 | 0 | 0 | 0 | 0 | 0.071 | 0 | 0 | 0 | 0 | 0 | 0.12 | 0 | 0.05 | 0.12 |
| 0.02 | 0 | 0 | 0.11 | 0 | 0 | 0 | 0 | 0 | 0 | 0 | 0 | 0.091 | 0 | 0.12 | 0 |
| 0 | 0.03 | 0 | 0 | 0 | 0 | 0.048 | 0 | 0 | 0 | 0.03 | 0 | 0 | 0 | 0 | 0 |
| 0 | 0.03 | 0 | 0 | 0 | 0 | 0.047 | 0 | 0 | 0 | 0.03 | 0 | 0 | 0 | 0 | 0 |
| 0 | 0 | 0 | 0 | 0 | 0 | 0.014 | 0 | 0 | 0 | 0 | 0 | 0 | 0 | 0 | 0 |

FIG. 9B

900

ECM 2

| | pucch_cqi | dra_pdcch | pucch_AN | ul_ue_retx | pusch_AN | dra_pdsch_newtx | dra_tti_selected_se | dra_pusch_newtx_req | dra_pusch_newtx_alloc | pucch_ri | pucch_sr | dl_ue_1tb_sched | ul_ue_received | dra_pusch_retx | build_phich_request_trace | handle_ul_harq_fb_trace |
|---|---|---|---|---|---|---|---|---|---|---|---|---|---|---|---|---|
| pucch_sr | 0 | 0.22 | 0 | 0 | 0 | 0 | 0.22 | 0.22 | 0 | 0 | 0 | 0 | 0 | 0 | 0 | 0 |
| handle_ul_harq_fb_trace | 0.11 | 0.086 | 0 | 0 | 0 | 0.037 | 0.14 | 0.038 | 0 | 0.034 | 0.015 | 0 | 0 | 0.052 | 0.15 | 0 |
| ul_ue_received | 0.08 | 0.074 | 0 | 0 | 0 | 0 | 0.14 | 0 | 0 | 0.019 | 0 | 0 | 0 | 0.061 | 0.097 | 0.22 |
| build_phich_request_trace | 0.22 | 0.019 | 0.037 | 0.05 | 0 | 0.012 | 0.057 | 0 | 0 | 0.07 | 0.022 | 0 | 0.09 | 0 | 0 | 0.079 |
| dra_pusch_newtx_req | 0.011 | 0 | 0 | 0 | 0 | 0 | 0 | 0 | 0.22 | 0 | 0 | 0 | 0.2 | 0 | 0.052 | 0.17 |
| dra_pusch_newtx_alloc | 0.011 | 0 | 0 | 0 | 0 | 0 | 0.096 | 0 | 0 | 0 | 0 | 0 | 0.22 | 0 | 0.12 | 0.2 |
| dra_tti_selected_se | 0 | 0.18 | 0 | 0.029 | 0 | 0.058 | 0 | 0.13 | 0.13 | 0 | 0 | 0.055 | 0 | 0.039 | 0.039 | 0 |
| dra_pdcch | 0 | 0 | 0.034 | 0 | 0 | 0.067 | 0 | 0.16 | 0.16 | 0 | 0 | 0.067 | 0.12 | 0 | 0.051 | 0 |
| pucch_AN | 0.13 | 0.07 | 0 | 0 | 0 | 0 | 0.092 | 0 | 0 | 0.044 | 0.086 | 0 | 0 | 0 | 0 | 0 |
| dl_ue_1tb_sched | 0.075 | 0 | 0.14 | 0 | 0 | 0 | 0.049 | 0 | 0 | 0.025 | 0.074 | 0 | 0 | 0 | 0.057 | 0 |
| dra_pdsch_newtx | 0.04 | 0 | 0.12 | 0 | 0 | 0 | 0 | 0 | 0 | 0.012 | 0.045 | 0.14 | 0 | 0 | 0.053 | 0 |
| ul_ue_retx | 0 | 0 | 0 | 0 | 0 | 0 | 0.071 | 0 | 0 | 0 | 0 | 0 | 0.12 | 0 | 0.05 | 0.12 |
| dra_pusch_retx | 0.02 | 0 | 0 | 0.11 | 0 | 0 | 0 | 0 | 0 | 0 | 0 | 0 | 0.091 | 0 | 0.12 | 0 |
| pucch_ri | 0 | 0.03 | 0 | 0 | 0 | 0 | 0.048 | 0 | 0 | 0 | 0.03 | 0 | 0 | 0 | 0 | 0 |
| pucch_cqi | 0 | 0.03 | 0 | 0 | 0 | 0 | 0.047 | 0 | 0 | 0 | 0.03 | 0 | 0 | 0 | 0 | 0 |
| pusch_AN | 0 | 0 | 0 | 0 | 0 | 0 | 0.014 | 0 | 0 | 0 | 0 | 0 | 0 | 0 | 0 | 0 |

FIG. 9C

900

ECM 3

| pusch_sqi | dra_pdsch | pucch_AN | ul_ue_retx | pusch_AN | dra_pdsch_newtx | dra_tti_selected_ss | dra_pusch_newtx_req | dra_pusch_newtx_alloc | pusch_ri | pucch_sr | dl_ue_1tb_sched | ul_ue_received | dra_pusch_retx | build_phich_request_trace | handle_ul_harq_fb_trace |
|---|---|---|---|---|---|---|---|---|---|---|---|---|---|---|---|
| 0 | 0.22 | 0 | 0 | 0 | 0 | 0.22 | 0.22 | 0 | 0 | 0 | 0 | 0 | 0 | 0 | 0 |
| 0.11 | 0.086 | 0 | 0 | 0 | 0.037 | 0.14 | 0.038 | 0 | 0.034 | 0.015 | 0 | 0 | 0.052 | 0.15 | 0 |
| 0.06 | 0.074 | 0 | 0 | 0 | 0 | 0.14 | 0 | 0 | 0.019 | 0 | 0 | 0 | 0.051 | 0.097 | 0.22 |
| 0.22 | 0.019 | 0.037 | 0.05 | 0 | 0.012 | 0.057 | 0 | 0 | 0.07 | 0.022 | 0 | 0.09 | 0 | 0 | 0.079 |
| 0.011 | 0 | 0 | 0 | 0 | 0 | 0 | 0 | 0.22 | 0 | 0 | 0 | 0.2 | 0 | 0.052 | 0.17 |
| 0.011 | 0 | 0 | 0 | 0 | 0 | 0.086 | 0 | 0 | 0 | 0 | 0 | 0.22 | 0 | 0.12 | 0.2 |
| 0 | 0.18 | 0 | 0.029 | 0 | 0.058 | 0 | 0.13 | 0.13 | 0 | 0 | 0.055 | 0 | 0.039 | 0.039 | 0 |
| 0 | 0 | 0.034 | 0 | 0 | 0.067 | 0 | 0.16 | 0.16 | 0 | 0 | 0.067 | 0.12 | 0 | 0.061 | 0 |
| 0.13 | 0.07 | 0 | 0 | 0 | 0 | 0.092 | 0 | 0 | 0.044 | 0.086 | 0 | 0 | 0 | 0 | 0 |
| 0.075 | 0 | 0.14 | 0 | 0 | 0 | 0.049 | 0 | 0 | 0.026 | 0.074 | 0 | 0 | 0 | 0.057 | 0 |
| 0.04 | 0 | 0.12 | 0 | 0 | 0 | 0 | 0 | 0 | 0.012 | 0.045 | 0.14 | 0 | 0 | 0.053 | 0 |
| 0 | 0 | 0 | 0 | 0 | 0 | 0.071 | 0 | 0 | 0 | 0 | 0 | 0.12 | 0 | 0.05 | 0.12 |
| 0.02 | 0 | 0 | 0.11 | 0 | 0 | 0 | 0 | 0 | 0 | 0 | 0 | 0.091 | 0 | 0.12 | 0 |
| 0 | 0.03 | 0 | 0 | 0 | 0 | 0.048 | 0 | 0 | 0 | 0.03 | 0 | 0 | 0 | 0 | 0 |
| 0 | 0.03 | 0 | 0 | 0 | 0 | 0.047 | 0 | 0 | 0 | 0.03 | 0 | 0 | 0 | 0 | 0 |
| 0 | 0 | 0 | 0 | 0 | 0 | 0.014 | 0 | 0 | 0 | 0 | 0 | 0 | 0 | 0 | 0 |

FIG. 9D

ECM 0

| | | | | | | | | | | | | | | | |
|---|---|---|---|---|---|---|---|---|---|---|---|---|---|---|---|
| 0 | 0.22 | 0 | 0 | 0 | 0 | 0.22 | 0.22 | 0 | 0 | 0 | 0 | 0 | 0 | 0 | 0 |
| 0.11 | 0.084 | 0 | 0 | 0 | 0.038 | 0.14 | 0.039 | 0 | 0.034 | 0.014 | 0 | 0 | 0.053 | 0.15 | 0 |
| 0.041 | 0.075 | 0 | 0 | 0 | 0 | 0.14 | 0 | 0 | 0.019 | 0 | 0 | 0 | 0.053 | 0.098 | 0.22 |
| 0.21 | 0.029 | 0.034 | 0.051 | 0 | 0.012 | 0.038 | 0 | 0 | 0.073 | 0.023 | 0 | 0.09 | 0 | 0 | 0.079 |
| 0.011 | 0 | 0 | 0 | 0 | 0 | 0 | 0 | 0.22 | 0 | 0 | 0 | 0.2 | 0 | 0.055 | 0.17 |
| 0 | 0.18 | 0 | 0.03 | 0 | 0.057 | 0 | 0.13 | 0.13 | 0 | 0 | 0.056 | 0 | 0.04 | 0.039 | 0 |
| 0.012 | 0 | 0 | 0 | 0 | 0 | 0.099 | 0 | 0 | 0 | 0 | 0 | 0.22 | 0 | 0.13 | 0.2 |
| 0 | 0 | 0.034 | 0 | 0 | 0.063 | 0 | 0.15 | 0.15 | 0 | 0 | 0.063 | 0.13 | 0 | 0.051 | 0 |
| 0.13 | 0.072 | 0 | 0 | 0 | 0 | 0.093 | 0 | 0 | 0.045 | 0.067 | 0 | 0 | 0 | 0 | 0 |
| 0.025 | 0 | 0.13 | 0 | 0 | 0 | 0.05 | 0 | 0 | 0.025 | 0.076 | 0 | 0 | 0 | 0.058 | 0 |
| 0.042 | 0 | 0.12 | 0 | 0 | 0 | 0 | 0 | 0 | 0.013 | 0.046 | 0.14 | 0 | 0 | 0.055 | 0 |
| 0 | 0 | 0 | 0 | 0 | 0 | 0.072 | 0 | 0 | 0 | 0 | 0 | 0.12 | 0 | 0.051 | 0.12 |
| 0.021 | 0 | 0 | 0.11 | 0 | 0 | 0 | 0 | 0 | 0 | 0 | 0 | 0.092 | 0 | 0.12 | 0 |
| 0 | 0.026 | 0 | 0 | 0 | 0.01 | 0.057 | 0 | 0 | 0 | 0.036 | 0 | 0 | 0 | 0 | 0 |
| 0 | 0.034 | 0 | 0 | 0 | 0 | 0.052 | 0 | 0 | 0 | 0.033 | 0 | 0 | 0 | 0 | 0 |
| 0 | 0 | 0 | 0 | 0 | 0 | 0.014 | 0 | 0 | 0 | 0 | 0 | 0 | 0 | 0 | 0 |

1102

Normal traffic profile

*FIG. 11*

ECM 0

| | | | | | | | | | | | | | | | |
|---|---|---|---|---|---|---|---|---|---|---|---|---|---|---|---|
| 0.17 | 0.047 | 0 | 0 | 0 | 0 | 0.054 | 0.044 | 0 | 0.054 | 0.018 | 0 | 0 | 0.035 | 0.14 | 0 |
| 0.095 | 0.045 | 0 | 0 | 0 | 0 | 0.08 | 0 | 0 | 0.029 | 0 | 0 | 0 | 0.034 | 0.13 | 0.2 |
| 0.23 | 0 | 0 | 0.035 | 0 | 0 | 0.065 | 0 | 0 | 0.084 | 0.033 | 0 | 0.079 | 0 | 0 | 0.032 |
| 0 | 0 | 0.012 | 0 | 0 | 0.015 | 0 | 0.19 | 0.19 | 0 | 0 | 0.016 | 0.13 | 0 | 0.05 | 0 |
| 0 | 0 | 0 | 0 | 0 | 0 | 0.042 | 0 | 0 | 0 | 0 | 0 | 0.2 | 0 | 0.15 | 0.2 |
| 0 | 0 | 0 | 0 | 0 | 0 | 0 | 0 | 0.2 | 0 | 0 | 0 | 0.2 | 0 | 0.05 | 0.14 |
| 0 | 0.16 | 0 | 0.022 | 0 | 0.015 | 0 | 0.16 | 0.16 | 0 | 0 | 0.015 | 0 | 0.032 | 0.032 | 0 |
| 0.059 | 0.16 | 0 | 0 | 0 | 0 | 0.2 | 0.12 | 0 | 0 | 0 | 0 | 0 | 0.033 | 0 | 0.053 |
| 0 | 0 | 0 | 0 | 0 | 0 | 0.05 | 0 | 0 | 0 | 0 | 0 | 0.15 | 0 | 0.094 | 0.15 |
| 0.02 | 0 | 0 | 0.12 | 0 | 0 | 0 | 0 | 0 | 0 | 0 | 0 | 0.12 | 0 | 0.14 | 0.025 |
| 0 | 0.064 | 0 | 0 | 0 | 0 | 0.11 | 0.056 | 0 | 0 | 0.063 | 0 | 0 | 0 | 0 | 0 |
| 0 | 0.061 | 0 | 0 | 0 | 0 | 0.1 | 0.056 | 0 | 0 | 0.058 | 0 | 0 | 0 | 0 | 0 |
| 0.015 | 0 | 0.049 | 0 | 0 | 0 | 0 | 0 | 0 | 0 | 0.028 | 0.044 | 0.012 | 0 | 0.012 | 0 |
| 0.018 | 0 | 0.049 | 0 | 0 | 0 | 0.022 | 0 | 0 | 0 | 0.05 | 0 | 0.013 | 0 | 0.013 | 0.012 |
| 0.012 | 0.029 | 0 | 0 | 0 | 0 | 0.044 | 0 | 0 | 0 | 0.063 | 0 | 0 | 0 | 0 | 0 |
| 0 | 0.011 | 0 | 0 | 0 | 0 | 0.012 | 0.011 | 0 | 0 | 0 | 0 | 0 | 0 | 0 | 0 |

1104

Test traffic profile

*FIG. 11 Continued*

ECM 0

| | | | | | | | | | | | | | | | |
|---|---|---|---|---|---|---|---|---|---|---|---|---|---|---|---|
| 0 | 0 | 0 | 0 | 0 | 0 | 0 | 0 | 0.045 | 0 | 0 | 0 | 0.04 | 0 | 0 | 0.023 |
| 0 | 0.036 | 0 | 0 | 0 | 0 | 0.044 | 0.027 | 0 | 0 | 0 | 0 | 0 | 0 | 0 | 0 |
| 0 | 0 | 0 | 0 | 0 | 0 | 0 | 0 | 0 | 0 | 0 | 0 | 0.043 | 0 | 0.019 | 0.04 |
| 0 | 0 | 0 | 0 | 0 | 0 | 0 | 0.029 | 0.029 | 0 | 0 | 0 | 0.016 | 0 | 0 | 0 |
| 0 | 0.028 | 0 | 0 | 0 | 0 | 0 | 0.02 | 0.02 | 0 | 0 | 0 | 0 | 0 | 0 | 0 |
| 0 | 0 | 0 | 0 | 0 | 0 | 0.011 | 0 | 0 | 0 | 0 | 0 | 0 | 0 | 0.012 | 0.043 |
| 0.014 | 0 | 0 | 0 | 0 | 0 | 0.012 | 0 | 0 | 0 | 0 | 0 | 0 | 0 | 0.034 | 0 |
| 0.05 | 0 | 0 | 0 | 0 | 0 | 0 | 0 | 0 | 0 | 0 | 0 | 0 | 0 | 0 | 0 |
| 0.045 | 0 | 0 | 0 | 0 | 0 | 0 | 0 | 0 | 0 | 0 | 0 | 0 | 0 | 0 | 0 |
| 0 | 0 | 0 | 0.014 | 0 | 0 | 0 | 0 | 0 | 0 | 0 | 0 | 0.011 | 0 | 0.017 | 0 |
| 0 | 0 | 0 | 0 | 0 | 0 | 0 | 0 | 0 | 0 | 0 | 0 | 0.016 | 0 | 0 | 0.018 |
| 0.017 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

1106

Trained profile

*FIG. 11 Continued*

SYSTEMS AND METHODS FOR MACHINE LEARNED NETWORK ACTIVITY PROFILING OF DEVICES

This application is a national phase application of International Patent Application No. PCT/IB2022/054129, filed May 4, 2022, which claims the benefit of U.S. Provisional Patent Application No. 63/203,087, filed Jul. 7, 2021, the disclosure of which are hereby incorporated herein by reference in their entirety.

TECHNICAL FIELD

The disclosed subject matter relates generally to network activity profiling of devices. Certain embodiments relate more particularly to systems and methods for machine learned network activity profiling of devices such as wireless handsets or internet of things (IoT) devices.

BACKGROUND

Generally, every connected device in a network (e.g., User Equipment (UE), Internet-of-Things (IoT) equipment, etc.) uses Radio Access Network (RAN) Uplink/Downlink (UL/DL) resources in a specific way that generally can be used to identify the device. As an example, a rogue/compromised device, which intentionally or unintentionally drains RAN resources, generally follows a certain finite set of protocol sequences or activity profile. For instance, from a RAN perspective, a rogue/compromised device may change its temporary radio identifier such as Cell Radio Network Temporary Identifier (C-RNTI) (e.g., by repeating Radio Resource Control (RRC) connection procedure, etc.) to evade detection and response.

However, the activity profiles of the rogue/compromised device will generally remain similar across different sessions. By learning the activity profiles of different types of UE behaviors, the learned activity profiles can then be compared with profiles of connected devices to understand their behavior. Thus, if found malicious, the RAN can take early steps to either neutralize such devices locally or report the incident to a central network node (e.g., a Security Management and Orchestration node, etc.) for further action. Additionally, by profiling (e.g., fingerprinting) the attack, RAN can distribute it to other parts of the network thus enabling detection and response in nodes that have not yet experienced such an attack.

RAN can be a target of a number of UE-triggered attacks aimed at service disruption (e.g., denial of service, resource exhaustion, etc.). For instance, rogue or compromised devices can use protocol-based attacks (where vulnerabilities in implementation of air interface protocols are exploited) and signaling storms (sending a high number of signaling massages to overwhelm RAN resources) to disrupt RAN operations.

Apart from traditional voice and Mobile Broadband (MBB) services, today's RAN systems are used in a number of new deployment scenarios such as Fixed Wireless Access (FWA), Automotive and Industry 4.0. These deployments come up with different security requirements related to prevention, detection, and response.

By understanding the types of traffic of the devices attached to the network and their activity profiles, RAN can adapt its prevention and response policies to better fulfill service level agreements in terms of availability and security. More specifically, while system level anomaly detection can be helpful to check overall RAN system health, creating activity profiles related to such attacks can be used for root cause analysis of the attack and classifying the entities involved.

Most of the attacks launched by IoT botnets and application malwares have either the same or substantially similar operational fingerprints, irrespective of where and when the attack is launched. Thus, by learning modus operandi or profile of the attack, it can be tracked anywhere in the network. In other words, no matter where the infected devices move, the network will be able to track their activity and take necessary actions from a detection and response perspective.

There currently exist certain challenge(s). As an example, some previous approaches have attempted to apply behavior profiling techniques to mobile devices to detect malware activity on the mobile device. These approaches considered profiling calls usage, device usage and Bluetooth network scanning among others. Specifically, these approaches explored the usage of device-level profiling but did not attempt to utilize radio interface profiling. Without the utilization of radio interface profiling or other similar techniques, the detection of malware activity is generally suboptimal.

As another example, other previous approaches have explored creating an intrusion detection system to detect spoofed devices in wireless networks (e.g., Bluetooth, WiFi, etc.). These approaches utilized user-based profiles which relied on mobility patterns to relate between different mobility behavior and spoofing. However, this form of attack detection is based on location and mobility data of the device. As such, mobility data cannot be utilized to detect static attackers (e.g., IoT devices, wireless sensors, etc.) who launch Denial of Service (DOS) attacks on RAN using the air interface.

SUMMARY

Certain aspects of the present disclosure and related embodiments may provide solutions to the aforementioned or other challenges. Specifically, by applying activity profiling to air interface data related to the Medium Access Control (MAC) layer, systems and methods of the present disclosure overcome the previously described challenges. For instance, systems and methods of the present disclosure employ an activity profile for a device comprising a sequence of protocol messages (at control plane) exchanged between the device and RAN. In some embodiments, the present disclosure derives features learned from the MAC layer data and develops a machine learning pipeline to learn activity profiles, which can then be used at a later time to identify malicious devices.

In some embodiments, a method is performed by a network node for training of machine-learned models for detection of abnormal User Equipment, UE, behavior. The method comprises obtaining training data comprising a plurality of interaction logs for a respective plurality of training UEs, and clustering each of the interaction logs of the training data into one or more activity clusters with a machine-learned behavior analysis model to learn one or more activities associated with at least one of the one or more activity clusters.

In certain related embodiments, obtaining the training data further comprises respectively determining a plurality of co-occurrence matrices for the plurality of interaction logs based at least in part on features of a Medium Access Control, MAC, layer of the network node, wherein a co-occurrence matrix is indicative of co-occurrences in interactions between a UE and the network node, and wherein the training data comprises the plurality of co-occurrence matrices.

In certain related embodiments, obtaining the air interface protocol training data further comprises respectively determining a plurality of eigen matrix components for the plurality of co-occurrence matrices, wherein an eigen matrix component is indicative of a degree of deviation from mean behavior for interactions between a UE and the network node, and wherein the training data comprises the plurality of eigen matrix components.

In certain related embodiments, the training data comprises air interface protocol training data comprising the plurality of interaction logs for the respective plurality of training UEs, wherein each of the plurality of interaction logs is descriptive of one or more normal interactions between the network node and a respective training UE of the plurality of training UEs. In some such embodiments, the one or more normal interactions between the network node and the respective training UE comprise one or more exchanges of control messages, and wherein each of the one or more activities are associated with unique frequencies of particular types of control messages known for that activity.

In certain related embodiments, the method further comprises obtaining air interface protocol data descriptive of one or more interactions between a network node and each of one or more UEs. In some such embodiments, the method further comprises, for each of the one or more UEs, processing the one or more interactions between a respective UE and the network node with the machine-learned behavior analysis model to obtain a behavior analysis output indicative of whether the one or more interactions between the respective UE and the network node deviates from normal behavior. The behavior analysis output may indicate that the one or more interactions between the respective UE and the network node deviates from normal behavior, and in some instances the one or more interactions between the respective UE and the network node are not associated with at least one of the one or more activity clusters.

In certain related embodiments, the method further comprises processing the air interface protocol data with the machine-learned behavior analysis model to obtain a behavior analysis output indicative of whether network traffic of the network node deviates from behavior. In some such embodiments, processing the air interface protocol data with the machine-learned behavior analysis model to obtain the traffic behavior output comprises one or more of respectively determining a plurality of training eigen matrix components for plurality of interaction logs of the training data, respectively determining one or more eigen matrix components for the one or more interactions between the network node and each of the one or more UEs of the air interface protocol data, and processing the plurality of training eigen matrix components and the one or more eigen matrix components with the machine-learned behavior analysis model to obtain the traffic behavior output indicative of whether network traffic of the network node deviates from normal behavior.

In certain related embodiments, the method further comprises performing, based at least in part on the one or more behavior analysis outputs, a corrective action for one or more of the network node or at least one of the one or more UEs.

In certain related embodiments, each of the plurality of interaction logs is descriptive of one or more normal interactions between a Radio Access Network, RAN, of the network node and a MAC layer of a respective training UE of the plurality of training UEs.

In certain related embodiments, the machine-learned behavior analysis model comprises a Gaussian Mixture Model, GMM.

In some embodiments, a network node for training of machine-learned models for detection of abnormal User Equipment, UE, behavior, wherein the network node is adapted to obtain training data comprising a plurality of interaction logs for a respective plurality of training UEs, and cluster each of the interaction logs of the training data into one or more activity clusters with a machine-learned behavior analysis model to learn one or more activities associated with at least one of the one or more activity clusters.

In certain related embodiments, the network node is further adapted to perform a method according to one or more embodiments described above.

In some embodiments, a network node for machine-learned detection of abnormal User Equipment, UE, behavior comprises processing circuitry configured to cause the network node to perform one or more operations, wherein the one or more operations comprise at least one of obtaining air interface protocol data comprising one or more interaction logs for one or more respective UEs, wherein each of the one or more interaction logs is descriptive of one or more interactions between the network node and a respective UE of the one or more UEs, and processing the air interface protocol data with a machine-learned behavior analysis model to obtain one or more behavior analysis outputs, wherein the machine-learned behavior analysis model is trained based at least in part on training data descriptive of normal interactions between UEs and the network node.

In certain related embodiments, obtaining the air interface protocol data comprising the one or more interaction logs for the one or more respective UEs further comprises respectively determining one or more co-occurrence matrices for the one or more interaction logs based at least in part on features of a Medium Access Control, MAC, layer of the network node, wherein a co-occurrence matrix is indicative of co-occurrences in interactions between a UE and the network node, and respectively determining one or more eigen matrix components for the one or more co-occurrence matrices, wherein an eigen matrix component is indicative of a degree of deviation from mean behavior for interactions between a UE and the network node, and wherein processing (1904) the air interface protocol data with the machine-learned behavior analysis model comprises processing the one or more eigen matrix components with the machine-learned behavior analysis model to obtain the one or more behavior analysis outputs.

In certain related embodiments, the one or more behavior analysis outputs comprise at least one of (a) for each of the one or more UEs, a UE behavior output indicative of whether the one or more interactions between a respective UE and the network node deviate from normal behavior and (b) a traffic behavior output indicative of whether network traffic of the network node deviates from normal behavior.

In certain related embodiments, the one or more operations further comprise performing (1906), based at least in part on the one or more behavior analysis outputs, a corrective action for one or more of the network node or at least one of the one or more UEs.

In certain related embodiments, each of the one or more interaction logs is descriptive of one or more interactions between a Radio Access Network, RAN, of the network node and a MAC layer of a respective UE of the one or more UEs.

In certain related embodiments, the machine-learned behavior analysis model comprises a Gaussian Mixture Model, GMM.

BRIEF DESCRIPTION OF THE DRAWINGS

The drawings illustrate selected embodiments of the disclosed subject matter. In the drawings, like reference labels indicate like features.

FIGS. 9A-9D illustrate a heatmap representation of the top four ECM learned from normal traffic log data.

DETAILED DESCRIPTION

Figure 1:
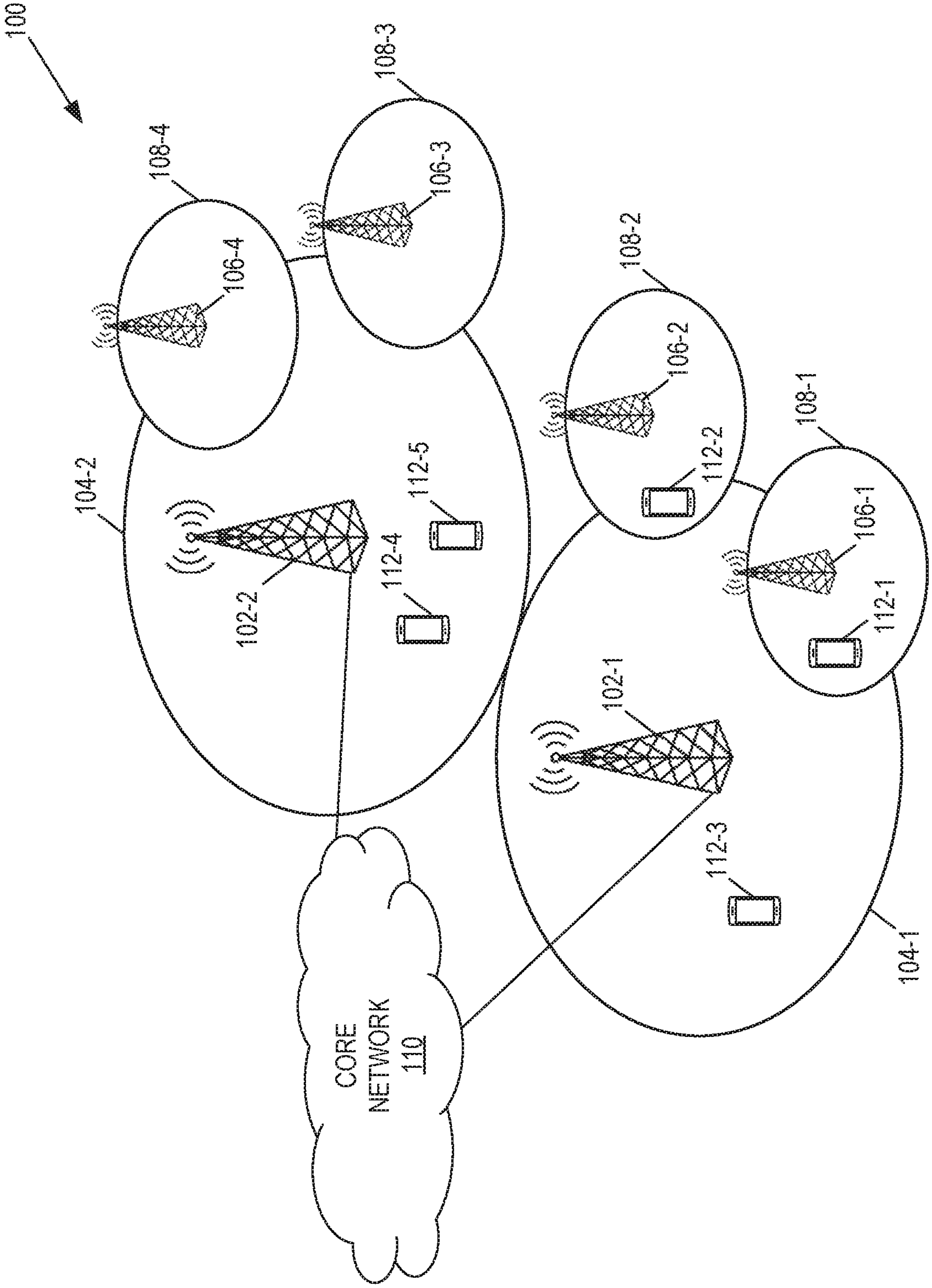
FIG. 1 illustrates one example of a cellular communications system in which certain embodiments of the present disclosure may be implemented.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Data from the MAC layer is used to derive features, which are then used to learn new activity profiles in the training phase and/or to compare a profile to existing sets of profiles in the testing phase. Generally, the data from the MAC layer that is used is related to scheduling new transmissions, resource allocation, Hybrid Automatic Repeat reQuest (HARQ), error correction, retransmission, Signal to Interference and Noise Ratio (SINR), Quality of Service (QOS), information about resource block sizes of sent/received packets, scheduling requests from the UE, and/or information on acknowledgment or negative acknowledgment from UE.

As described, the machine learning (ML) pipeline of the present disclosure utilizes three main phases: representation, profiling, and ML analysis. The first two phases prepare profiles using features from the MAC layer (e.g., data from the MAC layer, etc.), while the last phase utilizes the prepared profiles to analyze individual UE activities and overall traffic activity for anomalies.

In the representation phase, time-series data of UEs interaction with RAN from the MAC layer is used. Each UE is identified by its unique temporary radio identifier. Specifically, the following steps may be performed:

a. Given a time interval t, divide the time series data into non-overlapping windows [0, t], [t+1, 2t], . . . [(N−1) t+1, T] where T represents the total duration, and therefore providing N time windows. It should be noted that each UE may have different value of T (depending on its session duration), so this step may have different value of N for different UEs. Moreover, different time windows may include different numbers of UEs.

b. For each time window, construct a log sequence corresponding to each UE. The number of log sequences will be equal to number of UEs in that session. If $n_1$, $n_2$, . . . , $n_N$ are the number of UEs in time window 1, 2, . . . , N respectively, then $$M = \sum_{i=1}^{N} n_i$$

log sequences are obtained from the data.

c. Create a co-occurrence matrix of dimension $f \times f$ from each of the M log sequences. $f$ represents the number of features used from MAC layer (control messages in this case).

d. Row-normalize each of the M co-occurrence matrices.

After performing these steps, the output of the representation phase are M co-occurrence matrices, each of dimension $f \times f$.

In the profiling phase, the M co-occurrence matrices from the representation phase (which represents activities for all UEs) are converted to one matrix A. The dimensionality of A is then reduced to represent similar activities in compact and dense form. These steps are derived from [2], and are briefly described here:

a. Compute mean matrix m over M co-occurrence matrices and subtract it from each of them, i.e., center each of the M co-occurrence matrices around the mean of all matrices.

b. Vectorize each M co-occurrence matrix by concatenating its rows and stack them vertically. Thus, there are M vectors from this step, each of length $f \cdot f = f^2$.

c. Create matrix A by stacking all M vectors vertically. The dimension of A will be $f^2 \times M$.

d. Compute Singular Value Decomposition (SVD) of A. This provides K principal components matrices, known here as eigen co-occurrence matrices (ECMs).

e. Select first k from K ECMs ($k \leq K$). Different criteria can be used to select k, such as using a constant value (like selecting first 4 ECMs) or first k components covering x % of variance in the data.

f. Project each of the M vectors (output from Reconstruction phase) onto k selected ECMs to obtain matrix B. The dimension of B will be $M \times k$.

In the ML Modeling phase, the learnt profiles from the profiling phase are utilized to analyze UE activity and overall traffic. Specifically, regarding a UE interaction with RAN, it can be assumed that in each non-overlapping time window (represented by a log sequence) its activity can be expressed as one Z unique activity or as a mixture of Z unique activities (Z is parameter of clustering method). Based on this assumption, in the training phase, these activities can be learned from training data, while in the testing phase, the activity of each UE can be classified within each time window as either normal or anomalous.

Specifically, in the training phase, normal activities can be learned, and the machine-learned behavior analysis model is trained on matrix B from the profiling phase (e.g., on normal data) to learn the clustering structure of projected data in the Eigen Co-occurrence Matrix (ECM) space. The machine-learned behavior analysis model learns Z clusters (one for each activity) where Z is parameter of ML model. There are a number of model architectures that can be utilized for the machine-learned behavior analysis model, including but not limited to K-means, Hierarchical clustering, and Density-Based Spatial Clustering of Applications with Noise (DBSCAN). Specifically, the machine-learned behavior analysis model can be or otherwise include a Gaussian Mixture Model (GMM) for its probabilistic interpretation of modelling and data generation likelihood.

In the testing phase, the trained machine-learned behavior analysis model, k ECM profiles, and a mean co-occurrence matrix m computed from normal traffic data are utilized in the following steps given testing data:

a. Apply the steps described in representation phase to extract the co-occurrence matrices from the testing data.

b. For each co-occurrence matrix, subtract m from it and compute its projection along all of the k ECM profiles.

c. Using trained machine-learned behavior analysis model, compute the data likelihood for each UE activity in each time window. In simple words, the model provides a verdict (normal or anomalous) about each UE activity in each time window (given that the UE is present in that time window).

Apart from inferring each UE behavior in each time window, we can also compare overall traffic profiles between train and test data to analyze the behavior of the latter. The steps are described below:

a. Profile learning: for the training phase data (e.g., data descriptive of normal interactions between UEs and network node) and testing phase data (e.g., data descriptive of abnormal interactions between UEs and network node), learn K profiles (ECMs) and select top k profiles for analysis as previously described. Let k denote ECM components of training data as $\{E_{t1}, E_{t2}, \ldots, E_{tk}\}$, and testing data as $\{E_{s1}, E_{s2}, \ldots, E_{sk}\}$, where $P_{ti}$ and $P_{si}$ are $i^{th}$ ECM matrices in the training and testing data, respectively.

b. Profile differentiation: for each ECM component pair $(E_{ti}, E_{si})$, $i \in k$; compute element-wise product to obtain its Profile Product Matrix (PPM). More specifically, for each $i \in k$:

$$PPM_i = E_{ti} \circ E_{si}$$

Where $PPM_i$ is $i^{th}$ PPM and $\circ$ denotes Hadamard (element-wise) product. One or more (up to k) of the above PPM can be used for determination of a traffic anomaly. For instance, if the value for row/column index in given PPM is greater than zero, it indicates traffic anomaly related to the corresponding message pair from the perspective of that ECM train component. In general, the greater the value, the greater the degree of the anomaly. One can use two free parameters a and $\beta$ to tune the classification result. $\alpha \in \{1, 2, \ldots, k\}$ is the number of ECM matrices to use, while $\beta \in [0,1]$ is the threshold above which, values in PPM are classified as anomalous. To assess overall traffic anomaly from the perspective of given ECM train component, matrix-level statistics such as computing sum, mean, min, or max of corresponding PPM matrix can be used.

There are, proposed herein, various embodiments which address one or more of the issues disclosed herein. In one embodiment, a method is performed by a network node for training of machine-learned models for detection of abnormal UE behavior. The method includes one or more of obtaining training data including a plurality of interaction logs for a respective plurality of training UEs. The method includes one or more of clustering each of the interaction logs of the training data into one or more activity clusters with a machine-learned behavior analysis model to learn one or more activities associated with at least one of the one or more activity clusters.

In some embodiments, obtaining the air interface protocol training data further includes respectively determining a plurality of co-occurrence matrices for the plurality of interaction logs based at least in part on features of a MAC layer of the network node. A co-occurrence matrix is indicative of co-occurrences in interactions between a UE and the network node. In some embodiments, the training data includes the plurality of co-occurrence matrices.

In some embodiments, obtaining the air interface protocol training data further includes respectively determining a plurality of eigen matrix components for the plurality of co-occurrence matrices. An eigen matrix component is indicative of a degree of deviation from mean behavior for interactions between a UE and the network node. In some embodiments, the training data includes the plurality of eigen matrix components.

In some embodiments, the training data includes air interface protocol training data including the plurality of interaction logs for the respective plurality of training UEs. Each of the plurality of interaction logs is descriptive of one or more normal interactions between the network node and a respective training UE of the plurality of training UEs. In some embodiments, the one or more normal interactions between the network node and the respective training UE comprise one or more exchanges of control messages, and each of the one or more activities are associated with unique frequencies of particular types of control messages known for that activity.

In some embodiments, the method further includes obtaining air interface protocol data descriptive of one or more interactions between a network node and each of one or more UEs.

In some embodiments, the method further includes, for each of the one or more UEs, processing the one or more interactions between a respective UE and the network node with the machine-learned behavior analysis model to obtain a behavior analysis output indicative of whether the one or more interactions between the respective UE and the network node deviates from normal behavior. In some embodiments, the behavior analysis output indicates that the one or more interactions between the respective UE and the network node deviates from normal behavior, and the one or more interactions between the UE and the network node are not associated with at least one of the one or more activity clusters.

In some embodiments, the method further includes processing the air interface protocol data with the machine-learned behavior analysis model to obtain a behavior analysis output indicative of whether network traffic of the network node deviates from behavior. In some embodiments, processing the air interface protocol data with the machine-learned behavior analysis model to obtain the traffic behavior output includes one or more of: respectively determining a plurality of training eigen matrix components for plurality of interaction logs of the training data; respectively determining one or more eigen matrix components for the one or more interactions between the network node and each of the one or more UEs of the air interface protocol data; and/or processing the plurality of training eigen matrix components and the one or more eigen matrix components with the machine-learned behavior analysis model to obtain the traffic behavior output indicative of whether network traffic of the network node deviates from normal behavior.

In some embodiments, the method further includes performing, based at least in part on the one or more behavior analysis outputs, a corrective action for one or more of the network node or at least one of the one or more UEs.

In some embodiments, each of the plurality of interaction logs is descriptive of one or more normal interactions between a RAN of the network node and a MAC layer of a respective training UE of the plurality of training UEs.

In some embodiments, the machine-learned behavior analysis model includes a Gaussian Mixture Model (GMM).

In some embodiments, a network node is for training of machine-learned models for detection of abnormal UE behavior. The network node is adapted to obtain training data including a plurality of interaction logs for a respective plurality of training UEs. The network node is adapted to cluster each of the interaction logs of the training data into one or more activity clusters with a machine-learned behavior analysis model to learn one or more activities associated with at least one of the one or more activity clusters.

In some embodiments, a network node is for machine-learned detection of abnormal UE behavior. The network node includes processing circuitry configured to cause the network node to perform operations. The operations include one or more of obtaining air interface protocol data comprising one or more interaction logs for one or more respective UEs, wherein of the one or more interaction logs is descriptive of one or more interactions between the network node and a respective UE of the one or more UEs; and/or processing the air interface protocol data with a machine-learned behavior analysis model to obtain one or more behavior analysis outputs, wherein the machine-learned behavior analysis model is trained based at least in part on training data descriptive of normal interactions between UEs and the network node.

In some embodiments, obtaining the air interface protocol data comprising the one or more interaction logs for the one or more respective UEs further includes respectively determining one or more co-occurrence matrices for the one or more interaction logs based at least in part on features of a MAC layer of the network node. A co-occurrence matrix is indicative of co-occurrences in interactions between a UE and the network node. In some embodiments, obtaining the air interface protocol data comprising the one or more interaction logs for the one or more respective UEs further includes respectively determining one or more eigen matrix components for the one or more co-occurrence matrices. An eigen matrix component is indicative of a degree of deviation from mean behavior for interactions between a UE and the network node. In some embodiments, processing the air interface protocol data with the machine-learned behavior analysis model comprises processing the one or more eigen matrix components with the machine-learned behavior analysis model to obtain the one or more behavior analysis outputs.

In some embodiments, the one or more behavior analysis outputs include at least one of: for each of the one or more UEs, a UE behavior output indicative of whether the one or more interactions between a respective UE and the network node deviate from normal behavior; or a traffic behavior output indicative of whether network traffic of the network node deviates from normal behavior.

In some embodiments, the one or more operations further comprise performing, based at least in part on the one or more behavior analysis outputs, a corrective action for one or more of the network node or at least one of the one or more UEs.

In some embodiments, each of the one or more interaction logs is descriptive of one or more interactions between a RAN of the network node and a MAC layer of a respective UE of the one or more UEs.

In some embodiments, the machine-learned behavior analysis model comprises a GMM.

Certain embodiments may provide one or more of the following technical advantage(s). As one example technical advantage, systems and methods of the present disclosure enable RAN to detect rogue and/or compromised devices irrespective of whether such devices change their identifier (e.g., changing their temporary RAN identifier by renewing RRC connection procedure, etc.).

As another example technical advantage, systems and methods of the present disclosure assist RANs in root cause analysis by classifying devices into normal or rogue/compromised classes. Additionally, for traffic patterns, RAN is assisted in classifying different types of traffic, such as normal load, high (but otherwise legitimate) load, or malicious load (e.g., intentional, or unintentional).

As another example technical advantage, systems and methods of the present disclosure provide for activity profiles related to malicious activity that can be reported to the Service Management and Orchestrator (SMO) or the network, which can mark/track such activity in other parts of the network.

As another example technical advantage, systems and methods of the present disclosure facilitate reporting of Serving Temporary Mobile Subscriber Identities (S-TMSIs) of rogue/compromised devices to the core network, which can be mapped with their corresponding International Mobile Subscriber Identities (IMSIs) for possible mitigation.

As yet another example technical advantage, systems and methods of the present disclosure enable RAN to respond with an adaptive preventive policy based on profiles of attached devices. For example, depending on activity profiles of attached devices, RAN can follow preferential scheduling policy for normal and/or victim devices compared to compromised and/or malicious devices.

As such, systems and methods of the present disclosure facilitate a significant reduction of malicious activity by compromised or malicious devices (e.g., botnets, etc.). Malicious activity has significantly deleterious effects on network stability, efficiency, and service quality. By reducing malicious network activity, methods of the present disclosure significantly reduce the resources required to operate a network suffering from malicious activity (e.g., processing cycle(s), power, etc.), and also significantly increase the overall service quality for devices utilizing the network.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in the document(s) listed in the Appendix.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Transmission/Reception Point (TRP): In some embodiments, a TRP may be either a network node, a radio head, a spatial relation, or a Transmission Configuration Indicator (TCI) state. A TRP may be represented by a spatial relation or a TCI state in some embodiments. In some embodiments, a TRP may be using multiple TCI states. In some embodiments, a TRP may a part of the gNB transmitting and receiving radio signals to/from UE according to physical layer properties and parameters inherent to that element. In some embodiments, in Multiple TRP (multi-TRP) operation, a serving cell can schedule UE from two TRPs, providing better Physical Downlink Shared Channel (PDSCH) coverage, reliability and/or data rates. There are two different operation modes for multi-TRP: single Downlink Control Information (DCI) and multi-DCI. For both modes, control of uplink and downlink operation is done by both physical layer and Medium Access Control (MAC). In single-DCI mode, UE is scheduled by the same DCI for both TRPs and in multi-DCI mode, UE is scheduled by independent DCIs from each TRP.

In some embodiments, a set Transmission Points (TPs) is a set of geographically co-located transmit antennas (e.g., an antenna array (with one or more antenna elements)) for one cell, part of one cell or one Positioning Reference Signal (PRS)-only TP. TPs can include base station (eNB) antennas, Remote Radio Heads (RRHs), a remote antenna of a base station, an antenna of a PRS-only TP, etc. One cell can be formed by one or multiple TPs. For a homogeneous deployment, each TP may correspond to one cell.

In some embodiments, a set of TRPs is a set of geographically co-located antennas (e.g., an antenna array (with one or more antenna elements)) supporting TP and/or Reception Point (RP) functionality.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

FIG. 1 illustrates one example of a cellular communications system 100 in which embodiments of the present disclosure may be implemented. In the embodiments described herein, the cellular communications system 100 is a 5G system (5GS) including a Next Generation RAN (NG-RAN) and a 5G Core (5GC) or an Evolved Packet System (EPS) including an Evolved Universal Terrestrial RAN (E-UTRAN) and an Evolved Packet Core (EPC). In this example, the RAN includes base stations 102-1 and 102-2, which in the 5GS include NR base stations (gNBs) and optionally next generation eNBs (ng-eNBs) (e.g., LTE RAN nodes connected to the 5GC) and in the EPS include eNBs, controlling corresponding (macro) cells 104-1 and 104-2. The base stations 102-1 and 102-2 are generally referred to herein collectively as base stations 102 and individually as base station 102. Likewise, the (macro) cells 104-1 and 104-2 are generally referred to herein collectively as (macro) cells 104 and individually as (macro) cell 104. The RAN may also include a number of low power nodes 106-1 through 106-4 controlling corresponding small cells 108-1 through 108-4. The low power nodes 106-1 through 106-4 can be small base stations (such as pico or femto base stations) or RRHs, or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The cellular communications system 100 also includes a core network 110, which in the 5GS is referred to as the 5GC. The base stations 102 (and optionally the low power nodes 106) are connected to the core network 110.

The base stations 102 and the low power nodes 106 provide service to wireless communication devices 112-1 through 112-5 in the corresponding cells 104 and 108. The wireless communication devices 112-1 through 112-5 are generally referred to herein collectively as wireless communication devices 112 and individually as wireless communication device 112. In the following description, the wireless communication devices 112 are oftentimes UEs, but the present disclosure is not limited thereto.

Figure 2:
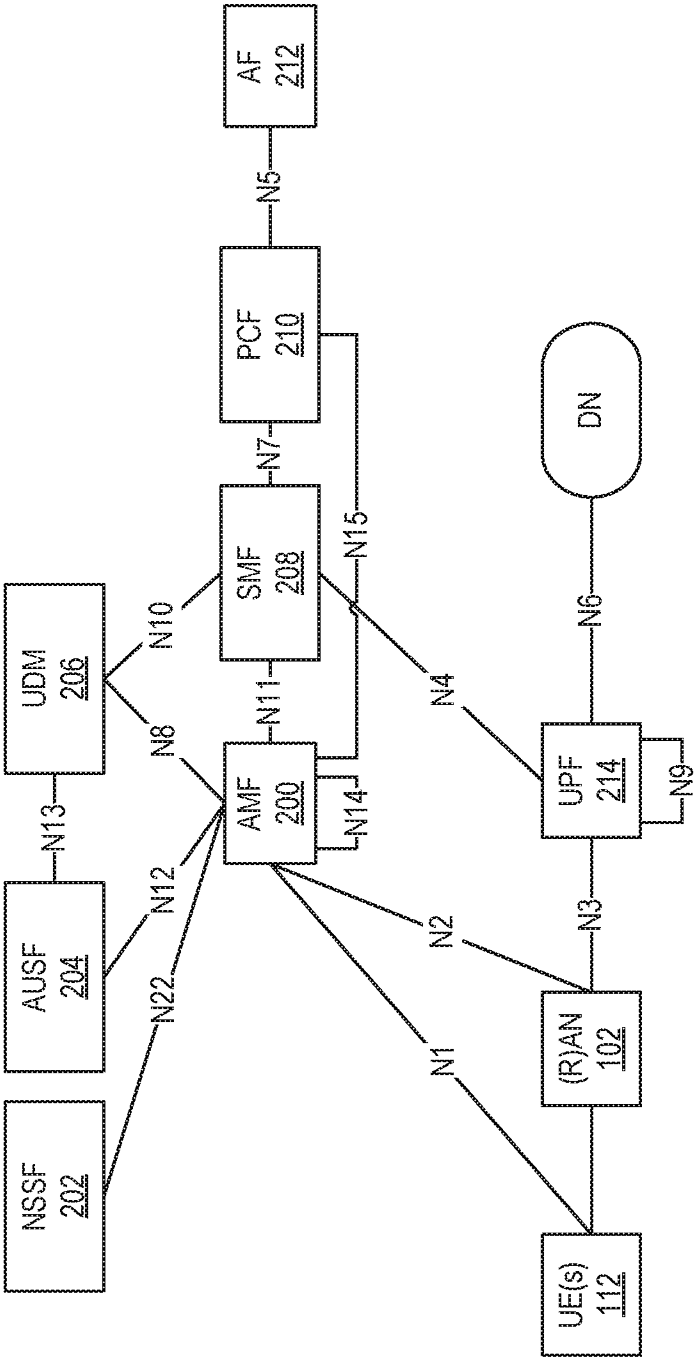
FIG. 2 illustrates a wireless communication system represented as a 5G network architecture composed of core Network Functions (NFs), where interaction between any two NFs is represented by a point-to-point reference point/interface.

FIG. 2 illustrates a wireless communication system represented as a 5G network architecture composed of core Network Functions (NFs), where interaction between any two NFS is represented by a point-to-point reference point/interface. FIG. 2 can be viewed as one particular implementation of the system 100 of FIG. 1.

Seen from the access side the 5G network architecture shown in FIG. 2 comprises a plurality of UEs 112 connected to either a RAN 102 or an Access Network (AN) as well as an AMF 200. Typically, the R (AN) 102 comprises base stations, e.g. such as eNBs or gNBs or similar. Seen from the core network side, the 5GC NFs shown in FIG. 2 include a NSSF 202, an AUSF 204, a UDM 206, the AMF 200, a SMF 208, a PCF 210, and an Application Function (AF) 212.

Reference point representations of the 5G network architecture are used to develop detailed call flows in the normative standardization. The N1 reference point carries signaling between the UE 112 and AMF 200. The reference points for connecting between the AN 102 and AMF 200 and between the AN 102 and UPF 214 are defined as N2 and N3, respectively. There is a reference point, N11, between the AMF 200 and SMF 208, which implies that the SMF 208 is at least partly controlled by the AMF 200. N4 is used by the SMF 208 and UPF 214 so that the UPF 214 can be set using the control signal generated by the SMF 208, and the UPF 214 can report its state to the SMF 208. N9 is the reference point for the connection between different UPFs 214, and N14 is the reference point connecting between different AMFs 200, respectively. N15 and N7 are defined since the PCF 210 applies policy to the AMF 200 and SMF 208, respectively. N12 is required for the AMF 200 to perform authentication of the UE 112. N8 and N10 are defined because the subscription data of the UE 112 is required for the AMF 200 and SMF 208.

The 5GC network aims at separating User Plan (UP) and Cyclic Prefix (CP). The UP carries user traffic while the CP carries signaling in the network. In FIG. 2, the UPF 214 is in the UP and all other NFs, i.e., the AMF 200, SMF 208, PCF 210, AF 212, NSSF 202, AUSF 204, and UDM 206, are in the CP. Separating the UP and CP guarantees each plane resource to be scaled independently. It also allows UPFs to be deployed separately from CP functions in a distributed fashion. In this architecture, UPFs may be deployed very close to UEs to shorten the Round-Trip Time (RTT) between UEs and data network for some applications requiring low latency.

The core 5G network architecture is composed of modularized functions. For example, the AMF 200 and SMF 208 are independent functions in the CP. Separated AMF 200 and SMF 208 allow independent evolution and scaling. Other CP functions like the PCF 210 and AUSF 204 can be separated as shown in FIG. 2. Modularized function design enables the 5GC network to support various services flexibly.

Each NF interacts with another NF directly. It is possible to use intermediate functions to route messages from one NF to another NF. In the CP, a set of interactions between two NFs is defined as service so that its reuse is possible. This service enables support for modularity. The UP supports interactions such as forwarding operations between different UPFs.

Figure 3:
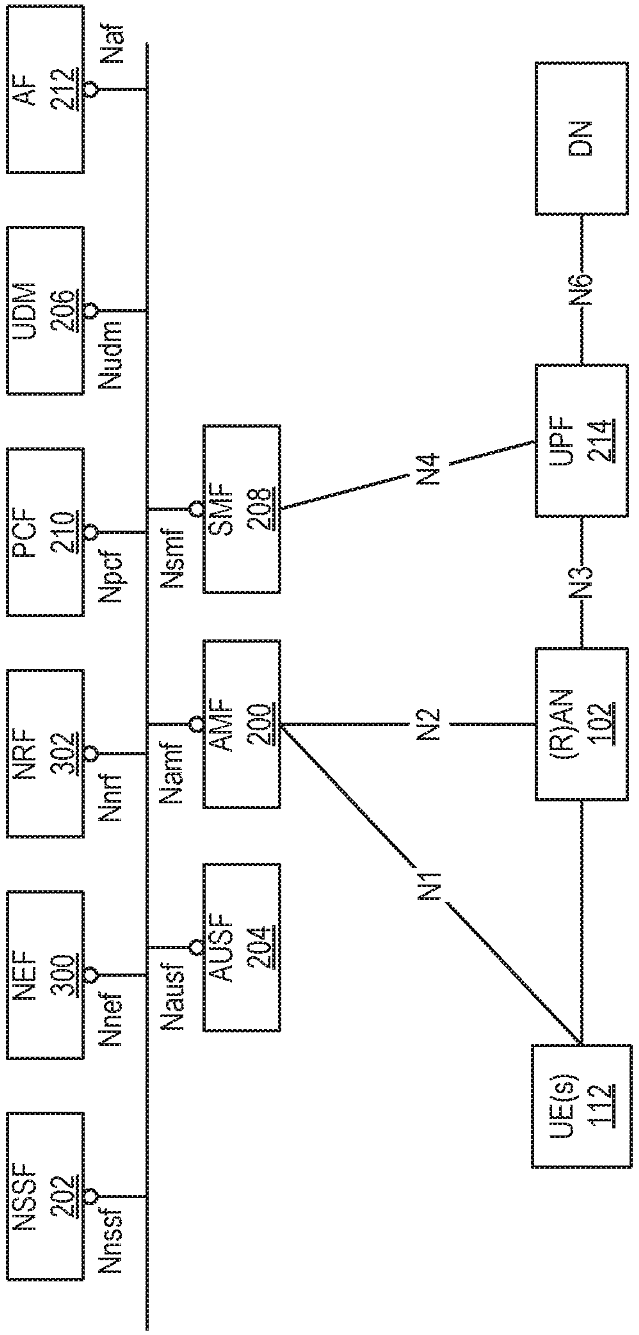
FIG. 3 illustrates a 5G network architecture using service-based interfaces between the NFs in the CP, instead of the point-to-point reference points/interfaces used in the 5G network architecture of FIG. 2.

FIG. 3 illustrates a 5G network architecture using service-based interfaces between the NFs in the CP, instead of the point-to-point reference points/interfaces used in the 5G network architecture of FIG. 2. However, the NFs described above with reference to FIG. 2 correspond to the NFs shown in FIG. 3. The service(s) etc. that a NF provides to other authorized NFs can be exposed to the authorized NFs through the service-based interface. In FIG. 3 the service based interfaces are indicated by the letter "N" followed by the name of the NF, e.g. Namf for the service based interface of the AMF 200 and Nsmf for the service based interface of the SMF 208, etc. The NEF 300 and the NRF 302 in FIG. 3 are not shown in FIG. 2 discussed above. However, it should be clarified that all NFs depicted in FIG. 2 can interact with the NEF 300 and the NRF 302 of FIG. 3 as necessary, though not explicitly indicated in FIG. 2.

Some properties of the NFs shown in FIGS. 2 and 3 may be described in the following manner. The AMF 200 provides UE-based authentication, authorization, mobility management, etc. A UE 112 even using multiple access technologies is basically connected to a single AMF 200 because the AMF 200 is independent of the access technologies. The SMF 208 is responsible for session management and allocates Internet Protocol (IP) addresses to UEs. It also selects and controls the UPF 214 for data transfer. If a UE 112 has multiple sessions, different SMFs 208 may be allocated to each session to manage them individually and possibly provide different functionalities per session. The AF 212 provides information on the packet flow to the PCF 210 responsible for policy control in order to support QoS. Based on the information, the PCF 210 determines policies about mobility and session management to make the AMF 200 and SMF 208 operate properly. The AUSF 204 supports authentication function for UEs or similar and thus stores data for authentication of UEs or similar while the UDM 206 stores subscription data of the UE 112. The Data Network (DN), not part of the 5GC network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Figure 4:
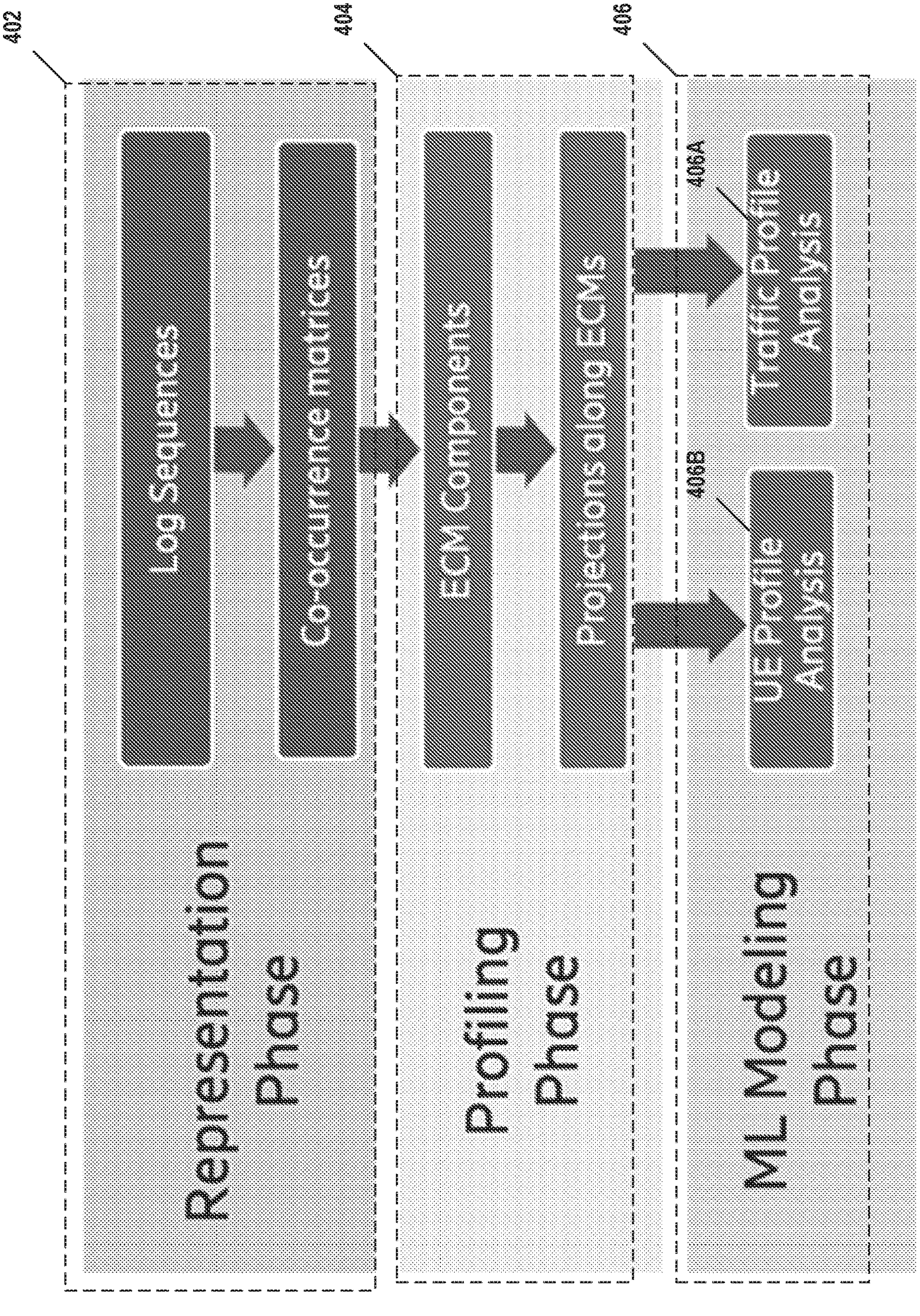
FIG. 4 depicts an overview data flow diagram for a machine learning pipeline for training and utilization of a machine-learned behavior analysis model.

FIG. 4 depicts an overview data flow diagram for a machine learning pipeline for training and utilization of a machine-learned behavior analysis model. More specifically, the machine learning pipeline 400 includes a representation phase 402, a profiling phase 404, and/or a modeling phase 406. In some embodiments, the systems and methods of the present disclosure are based at least in part on the concept of profiling the activities of pos-authentication UEs at RAN level. The activity profile of a UE can be defined as a sequence of actions the UE is performing to fulfill a function according to some protocol. For instance, from a UE perspective, attachment, registration, scheduling, Uplink/Downlink (UL/DL) transmission, and acknowledgement are examples of activities. These activities can be captured in a sequence of MAC layer control messages, which can be recorded at eNB side at RAN level.

As depicted, the representation phase 402 and the profiling phase 404 can be considered as feature engineering segments, while the ML modeling phase 406 can utilize these engineered features to construct and classify activity-based profiles for overall traffic and/or individual UEs. As an example, the time series log of MAC layer control messages can be used to detect mappable malicious activities with respect to deviation from normal traffic.

Figure 6:
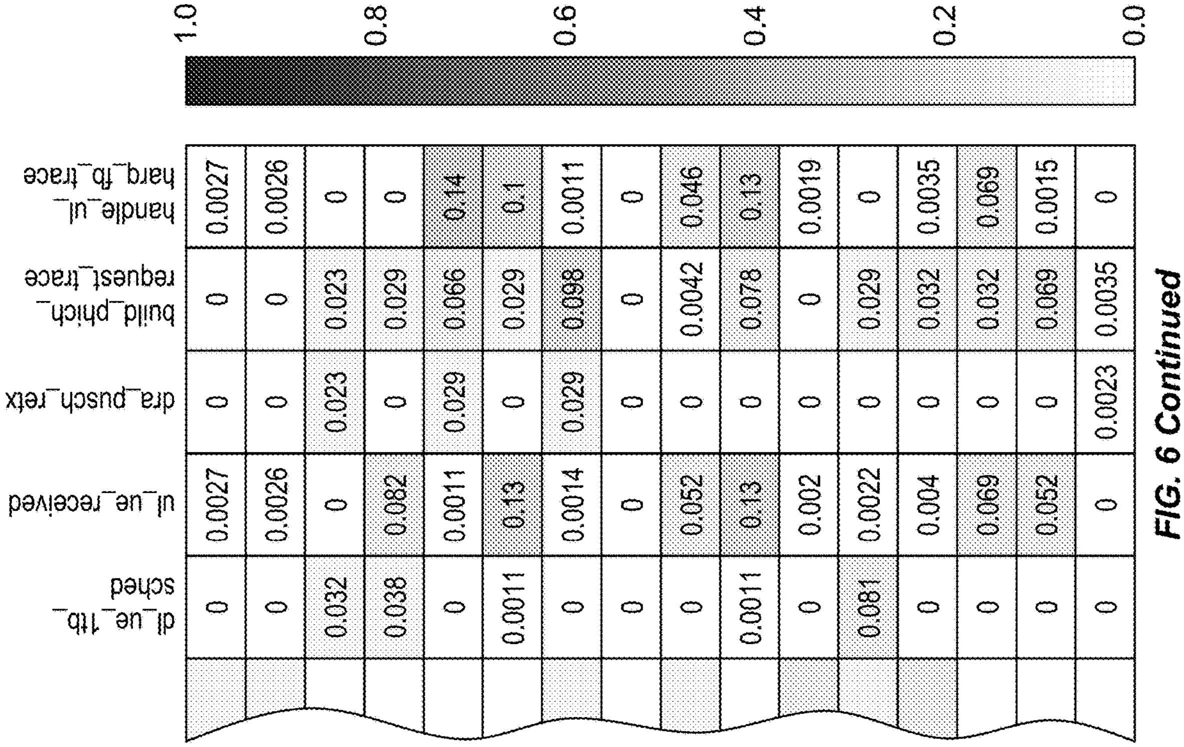
FIG. 6 represents a heat map representation of mean co-occurrence matrix averaged over all M co-occurrence matrices constructed from a traffic log descriptive of normal behavior.

More specifically, in the representation phase 402, raw log messages can be processed into meaningful features that can be used to profile activities. There are a number of NLP approaches that can be used to convert sequence of log messages into features based on word sequence models, such as Bag-of-Words (BOW) model, n-gram model, etc. The Bag-of-word model is an order-less representation of a log sequence, where log sequences are observed as a collection of messages (tokens) without considering their sequence order (e.g., word count vectors, Term Frequency-Inverse Document Frequency (TF-IDF), word hashing, etc.). The n-gram model, on the other hand, takes into account the order information while scanning the log sequence by sliding a window of a given size (e.g., bigram models, trigram models, etc.). The bigram catches the co-occurrence pattern of two messages in a short context sliding over a sequence. The more general approach is to construct co-occurrence matrix over all messages within a given context size as shown in FIG. 6.1.1-1. For instance, in some embodiments, a co-occurrence matrix method is utilized by systems and methods of the present disclosure to represent a log sequence.

Figure 5:
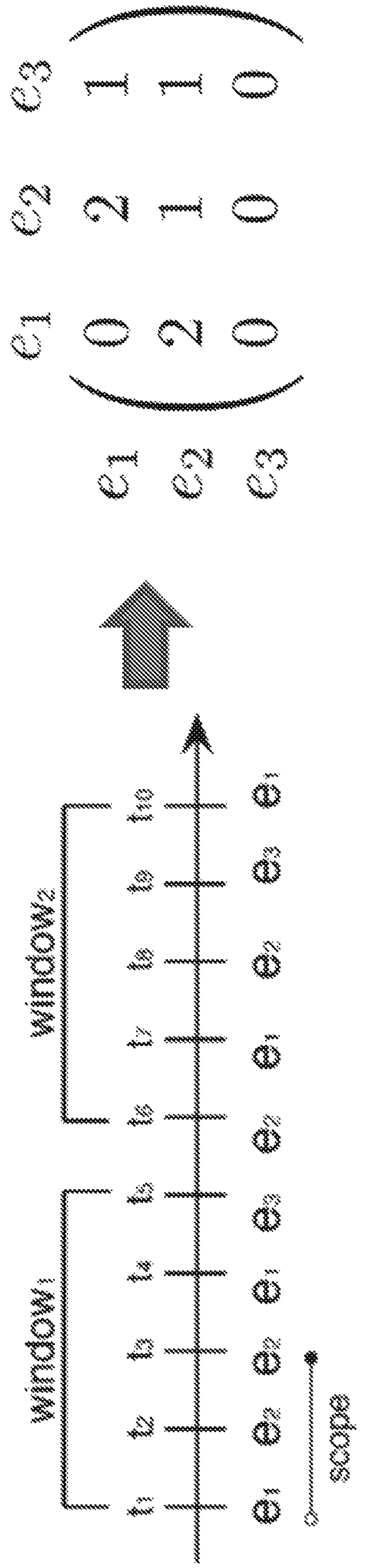
FIG. 5 illustrates a co-occurrence matrix construction diagram.

Turning to FIG. 5, a co-occurrence matrix construction diagram is illustrated. More specifically, for each log sequence, events (e.g., messages, etc.) that have co-occurred in a certain context (e.g., a certain scope, etc.) are counted in co-occurrence matrix pairwise. For instance, in the illustrated example, the pair (e1, e2) occurred twice in the scope.

Returning to FIG. 4, the representation phase 402 includes at least some of the following steps:

a. Parsing the log time series data (e.g., a batch file) into log sequence S per UE (e.g., identified by its Radio Network Temporary Identifier (RNTI), etc.) R by sliding a non-overlapping time window W with a pre-specified time t (e.g., in milliseconds). If $n_1, n_2, \ldots, n_N$ are the number of RNTIs in time window 1, 2, . . . , N respectively, then $$M = \sum_{i=1}^{N} n_i$$

log sequences can be obtained from the data.

b. For each S per R in W, we constructed co-occurrence matrix C. In some embodiments, turning to FIG. 5, the co-occurrence matrix C can be constructed as depicted in FIG. 5. As an example, each control message can be scanned as depicted in event e in FIG. 5 in that log sequence for an RNTI and count co-occurrence pair if two messages (events) lie within the same scope. The scope parameter decides the size of the context in which co-occurrence of messages can be counted in the co-occurrence matrix. In some embodiments, the scope size parameter is set to be 4 (number of messages) based on maximization of cosine similarity among all matrices.

c. A row-normalization operation can be performed on each C per R per W to convert it into probabilities of observing a co-occurrence pair with respect to total occurrence of a message corresponding to row.

As such, the input to phase 402 can be a batch file of normal traffic log(s) or any other data descriptive of interaction logs between UE(s) and a network node (e.g., the MAC layer of the UE(s) and the RAN of the network node, etc.).

The corresponding output can be M co-occurrence matrices, one for each log sequence. Turning to FIG. 6, FIG. 6 represents a heat map representation of mean co-occurrence matrix averaged over all M co-occurrence matrices constructed from a traffic log descriptive of normal behavior. The co-occurrence pair having smaller values (<0.001) are turned to zero for better visibility. The mean co-occurrence matrix is representing the average activity traced by log messages during the lifetime of a UE. The lifetime of a UE is its session length with RAN (represented by a unique RNTI). If the session is reset, the same UE will most generally be provided with a different RNTI.

Returning to FIG. 4, the advantage of co-occurrence matrix is that if two messages co-occurred or not in an activity or as a part of protocol, it will be reflected in all of co-occurrence matrices. The activities similar to a protocol will produce same patterns in co-occurrence matrices for all devices following the same activity. Additionally, the co-occurrence matrix can directly be transformed into features set, where each pair can be represented as a feature. However, this feature set will be sparse and many of the entries will zeros due to non-occurrences of messages. As such, in profiling phase 404, compression of co-occurrences matrices can be performed using Principal Component Analysis (PCA).

In profiling phase 404, M co-occurrence matrices are converted from the representation phase (which represents activities for all UEs) to one large matrix A. Then, dimensionality of matrix A is reduced to represent similar activities in compact and dense form. More specifically, similar co-occurrence matrices, which are due to the device following same/similar protocol, can be represented in a similar profile. As such, performing this step can be advantageous.

Many candidate methods can be utilized to reduce the dimensionality of the co-occurrence matrices space ranging from a non-linear setting to a linear setting. In some embodiments, a standard PCA method is utilized, such as the Eigen Co-occurrence Matrix (ECM). The ECM method profile matrix A into fewer eigen components thereby, reducing the high dimensionality into fewer components matrices.

Figure 7:
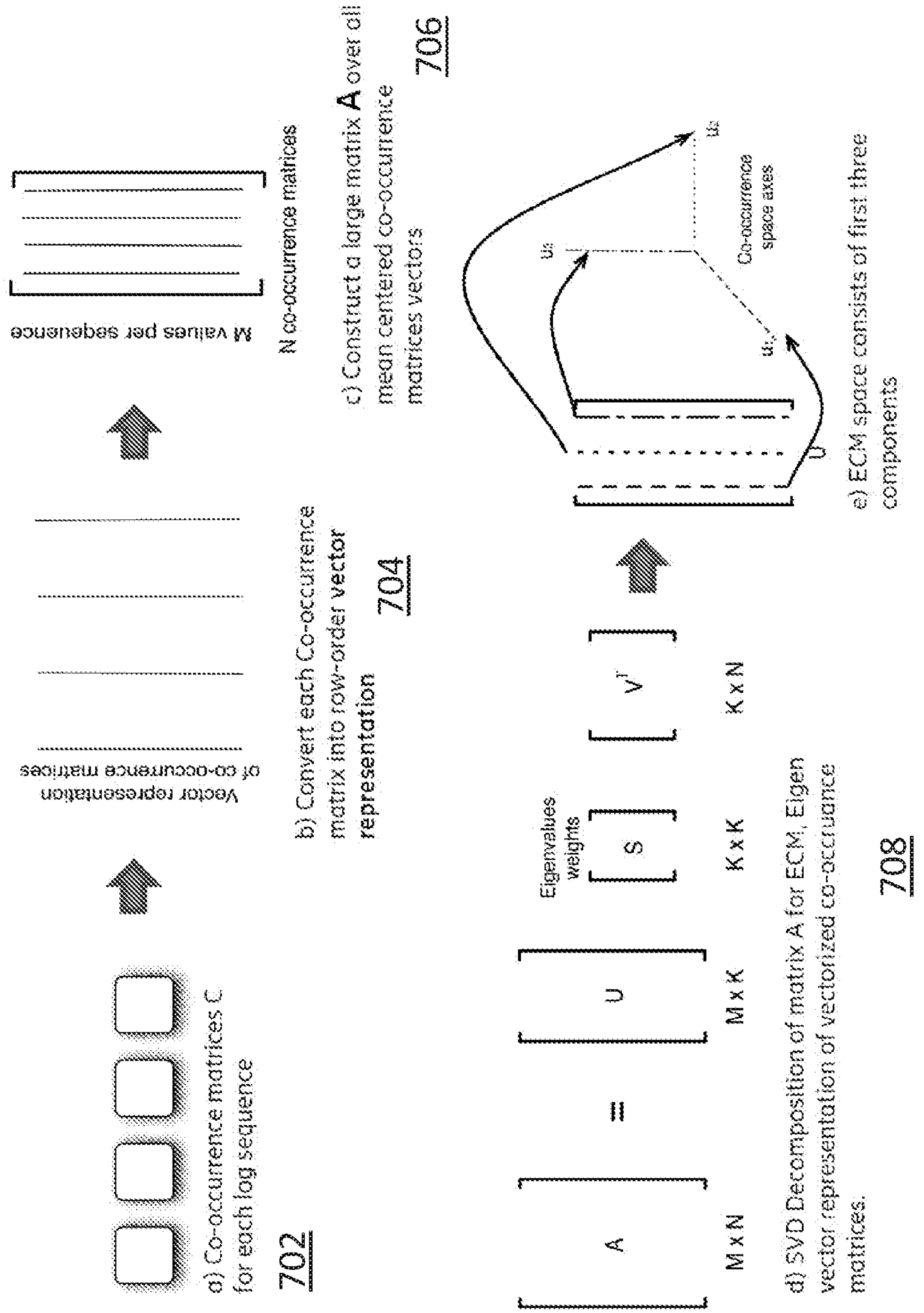
FIG. 7 illustrates an example implementation of Eigen co-occurrence matrix computation.

An example implementation of Eigen co-occurrence matrix computation is illustrated in FIG. 7. For example, turning to FIG. 7, at step 702, M co-occurrence matrices are obtained (e.g., from the representation phase 402 of FIG. 4, etc.).

At step 704, each of the M matrices are vectorized in row-order. More specifically, each of the co-occurrence matrices are vectorized by concatenating the rows of the matrices and then stacked vertically. For instance, in a normal traffic log data file, if there are M=3860 co-occurrence matrices and $f$=16 features are being used, then the dimension of each co-occurrence matrix will be 16×16, and the length of each of the resulting vectors will be $f^2$=256. The dimension of matrix A will be $f^2 \times M$.

At step 706, after vectorizing the M matrices in row-order, all M matrices are then stacked in a large matrix A, and matrix A is centered by subtracting the mean (e.g., over all matrices in M from the matrix. For instance, matrix A can be centered by subtracting the mean matrix computed over all columns of A.

At step 708, singular value decomposition (SVD) is computed on matrix A, which gives us K principal components matrices known as eigen co-occurrence matrices (ECMs).

Returning to FIG. 4, it should be noted that the profiling phase 404 provides a number of advantages. More specifically, by determining PCA of co-occurrence matrices in the manner described previously (e.g., by staking them columnwise in a matrix, etc.), the dimensionality co-occurrence matrices can be reduced into fewer component matrices (e.g., ECMs). The first k≤K components can be picked according to the percentage of the total variance (e.g., 90%, 95%, 99%, etc.) to determine the ECM space. The k parameter can automatically be determined by the cumulative sum of sorted eigen values greater than or equal to a given percentage of the total variance.

Figure 8:
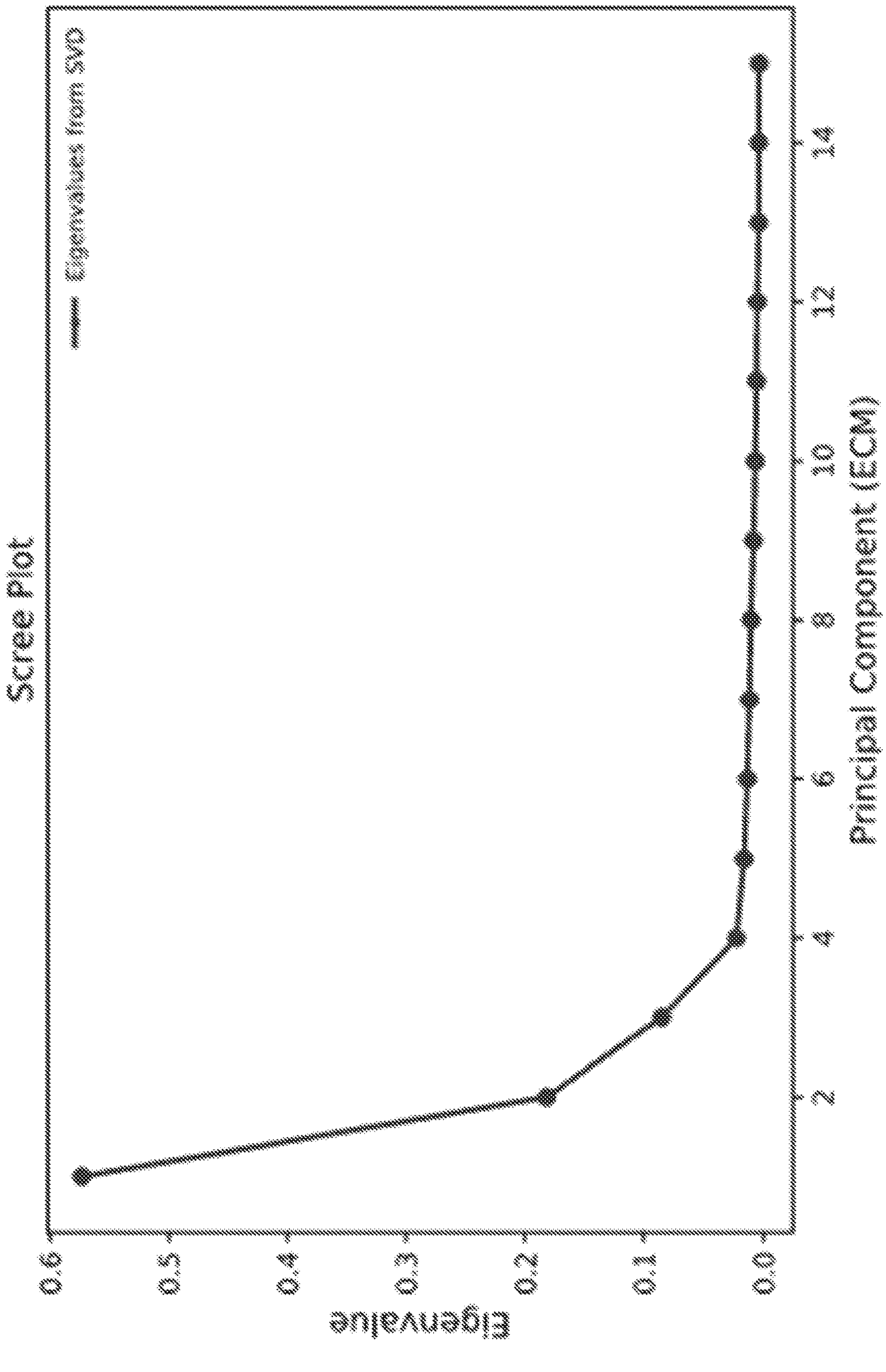
FIG. 8 illustrates an example of selection of first k≤K components according to percentage of total variance to determine the ECM space.

An example of selection of first k≤K components according to percentage of total variance to determine the ECM space is illustrated in FIG. 8. Turning to FIG. 8, a scree plot is illustrated for ECM to pick K components. For example, the singular value decomposition SVD of the centered matrix provides first K components according to cumulative percentage of the total variance (e.g., 90%, 95%, 99%) which determine the ECM space.

Returning to FIG. 4, the profiling phase 404 provides additional advantages. As an example, out-of-sample data can be transformed by using previously learned ECM profiles on normal data to extract features in the reduced ECM space in terms of projections along these components. As another example, conventionally, the co-occurrence matrices are sparse due to many pairs results in zero counts. Conversely, however, ECM provides for dense feature representation for each co-occurrence matrix, which can be used as profiles to recognize activities in the ECM space.

Figure 9A:
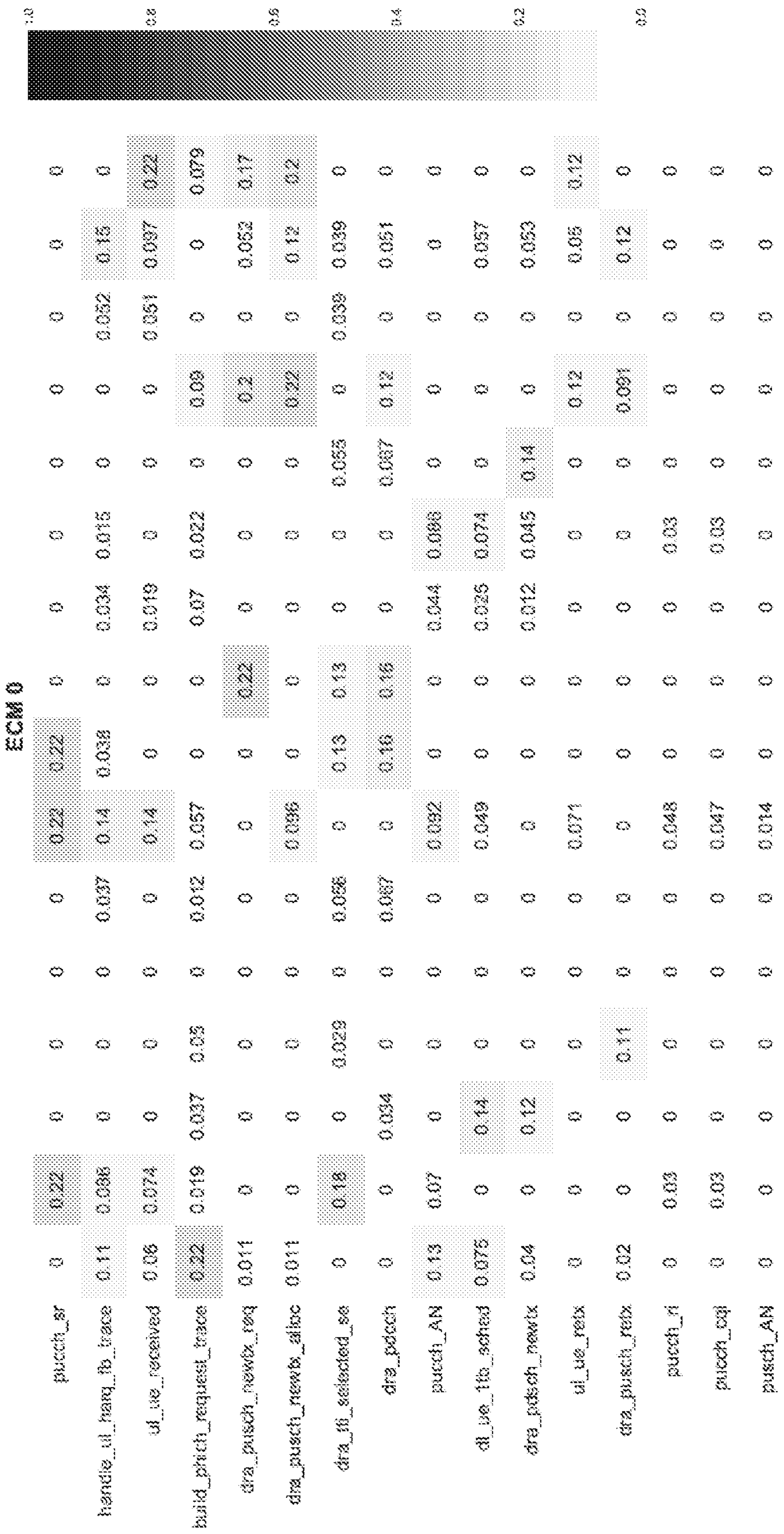

More specifically, ECMs are the summary profiles of the normal traffic log data. The ECMS learn the normal behaviors in terms of principle components. For example, FIG. 9 illustrates a heatmap representation 900 of the top four ECM learned from normal traffic log data. Turning to FIG. 9, each component illustrated in the heatmap 900 is orthonormal to the rest, thereby capturing different set of activities in response to variation around mean activity represented by mean co-occurrence matrix.

The co-occurrence pairs with high eigen vector values in the heatmap 900 are showing strong correlation among messages that co-occurred in a particular activity with respect to mean activity, whereas smaller eigen vector values indicate weak correlations. Another feature of the heatmap 900 is the level of detail each ECM component is providing. For example, the number of co-occurrence pairs with high eigen vector values are decreasing with the order of respective eigen components. This is due to the fact that top component is in the direction of maximum variance, thereby capturing large variations in activities with respect to mean co-occurrence matrix (e.g., average activity). Similarly, the second component is orthogonal to the first component and capturing variation in the direction of second principal component, and so on.

Figure 10A:
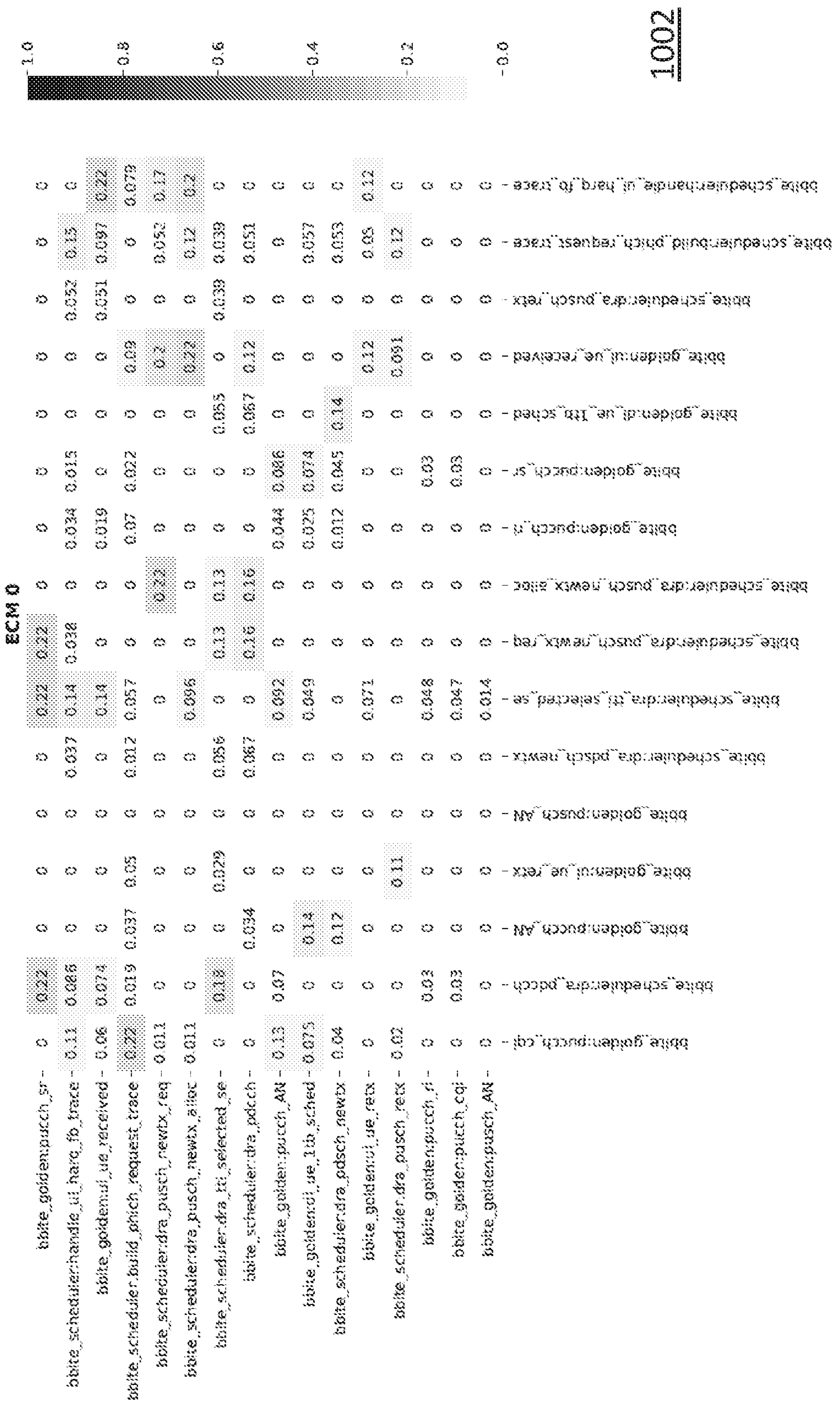
FIGS. 10A-10B illustrate an example network representation of an ECM component for normal traffic log data.
Figure 10B:
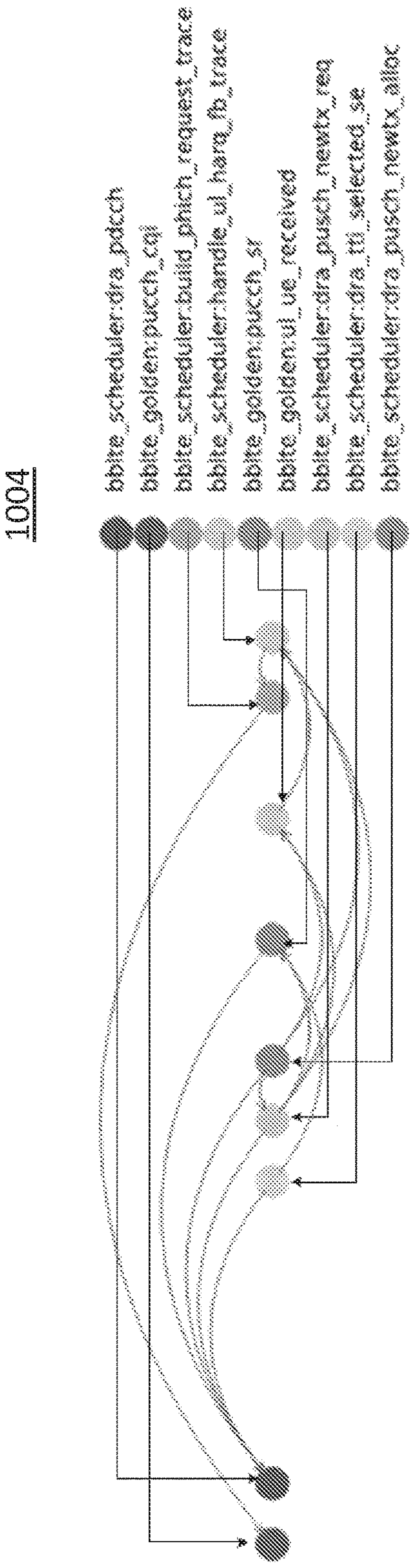

Another advantage of ECM profiling is illustrated in FIG. 10. Turning to FIG. 10, an example network representation 1004 of an ECM component 1002 for normal traffic log data is illustrated. The nodes of the network representation 1004 represent MAC layer control messages. Edges connect preceding messages with a following message if the corresponding entry in ECM has greater value than or equal to a given threshold (e.g., 0.2, etc.). As depicted, one example advantage of ECM profiling is that activities can be extracted in each component by thresholding on eigen vector values. Specifically, in network representation, messages are represented as nodes and the co-occurrence pattern is represented as edges that have high values in respective ECM. The network is directed because co-occurrence pattern is recorded as directed pair while constructing co-occurrence matrices. The network is not showing any starting or ending node; however, it shows ongoing activity as a co-occurrence pairs connected by messages participating in an activity or activities.

The single network representation 1004 may represent one or more activities based on thresholding eigen values in the ECM profile 1002. For example, the network representation 1004 provides an opportunity to observe loop behavior to signify the protocol-based repeated procedures and strong edges representing the co-occurrence pair important for an activity. Additionally, the network representation 1004 can be used to recognize previously recorded activities, such as a signature that was previously observed and recorded in a network and/or network-associated database (e.g., for threat intelligence purposes, etc.).

Returning to FIG. 4, in ML modeling phase 406, the profiles learnt in the profiling phase 404 are utilized to analyze both overall traffic activity and UE activity.

Specifically, in traffic profile analysis phase 406A, ECM matrices (representing profiles) from normal traffic logs are used to extract network representation of each ECM matrix and characterize activities performed by an average UE during its lifetime. Similarly, we can use ECM matrices to extract activity patterns in the test traffic to check significant differentiation from normal traffic. To extract the patterns and check for significant deviation from normal traffic, the following steps can be performed:

A. Steps 702, 704, 706, and 708 of FIG. 7 are performed on test traffic data to get K ECM matrices and select top k≤K matrices.

B. Given $i^{th}$ ECM matrix for normal and test traffic data, Profile Product Matrix (PPM) can be computed using Hadamard (element-wise) product of the two ECM matrices, providing the element wise correlation among eigen values of the corresponding pairs in both ECM matrices.

C. To construct the network representation over PPM, an adjacency matrix can be formed over co-occurrence pairs with product values greater than a particular threshold (e.g., 0.2, etc.) and draw a directed network from co-occurrence pairs.

Figure 11:
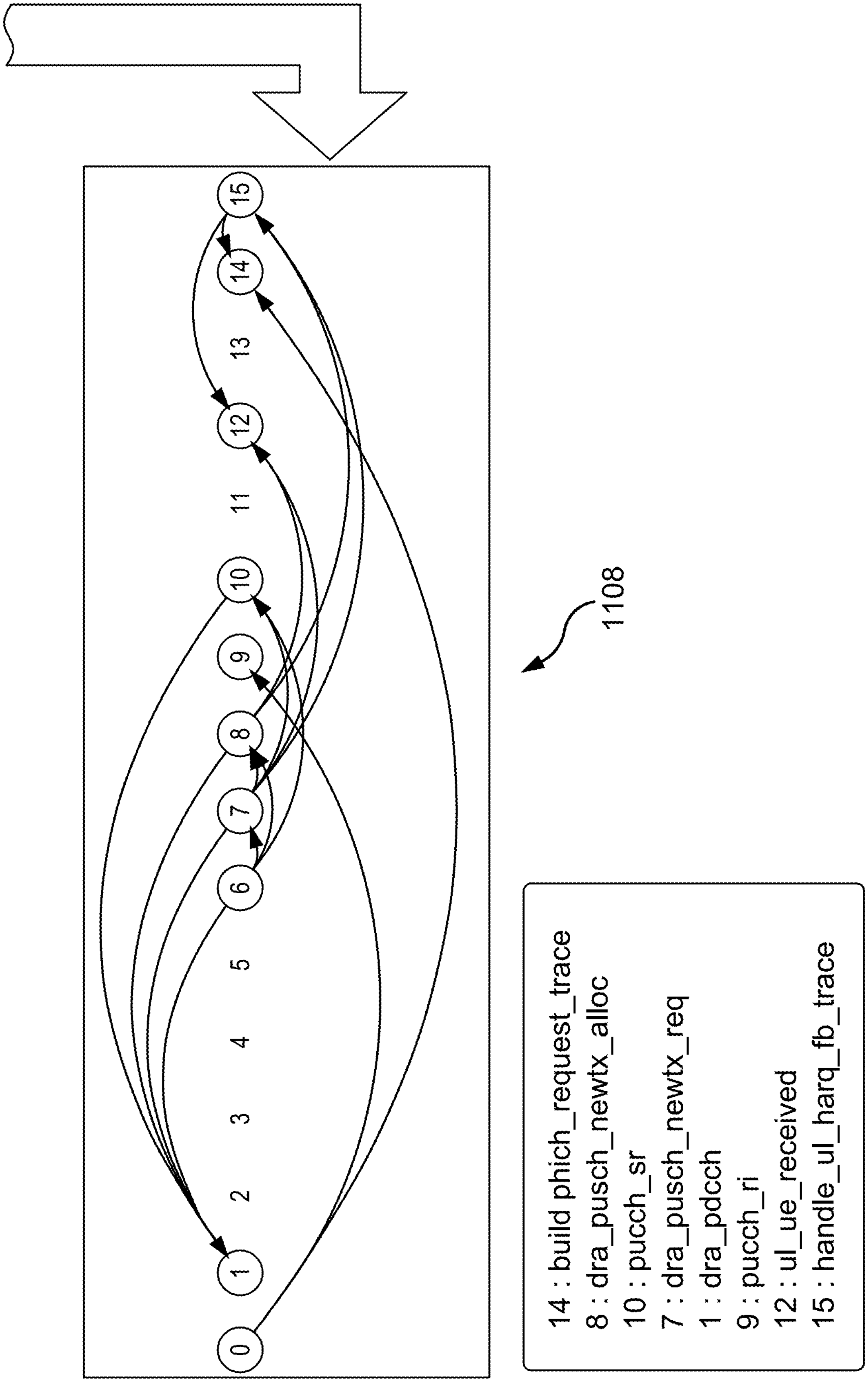
FIG. 11 illustrates an example of network representation extraction and activity characterization.

One example of network representation extraction and activity characterization is illustrated in FIG. 11. Turning to FIG. 11, normal traffic profile 1102 and test traffic profile 1104 are extracted according to step A. Trained profile 1106 is computed using the normal traffic profile 1102 and test traffic profile 1104 according to step B. Finally, the network representation 1108 is constructed based on the trained profile 1106 according to step C. For example, element-wise multiplication of normal and test ECM matrices 1102 and 804 are performed to obtain PPM. PPM is converted to binary matrix using thresholding (e.g., 0.2), which represents the adjacency matrix 1106 and can be used to create network representation 1108 of all connected nodes by connecting nodes in adjacency matrix cells that are 1.

Returning to FIG. 4, in phase 406B, the UE profile is analyzed. Specifically, at RAN level, when a UE tries to communicate with eNB by exchanging control messages, the log is being recorded as a time series to realize the activity being performed according to the 3GPP protocols. These activities are captured using co-occurrence matrices and each such matrix can be considered a representation of an activity in terms of its co-occurrence patterns of log messages that distinguish it from other activities. These co-occurrence matrices are compressed using ECM as described with regards to the profiling phase 404, which are profiled into a dense representation i.e., in the form of ECM matrices. ECM profiles are computed by projecting co-occurrence matrix along k orthogonal ECM components in ECM space. If a profile is similar to mean activity, it will be placed near to the center of the projected data, and if the profile is different from mean activity, it will form a separate cluster representing another set of activity.

Figure 12:
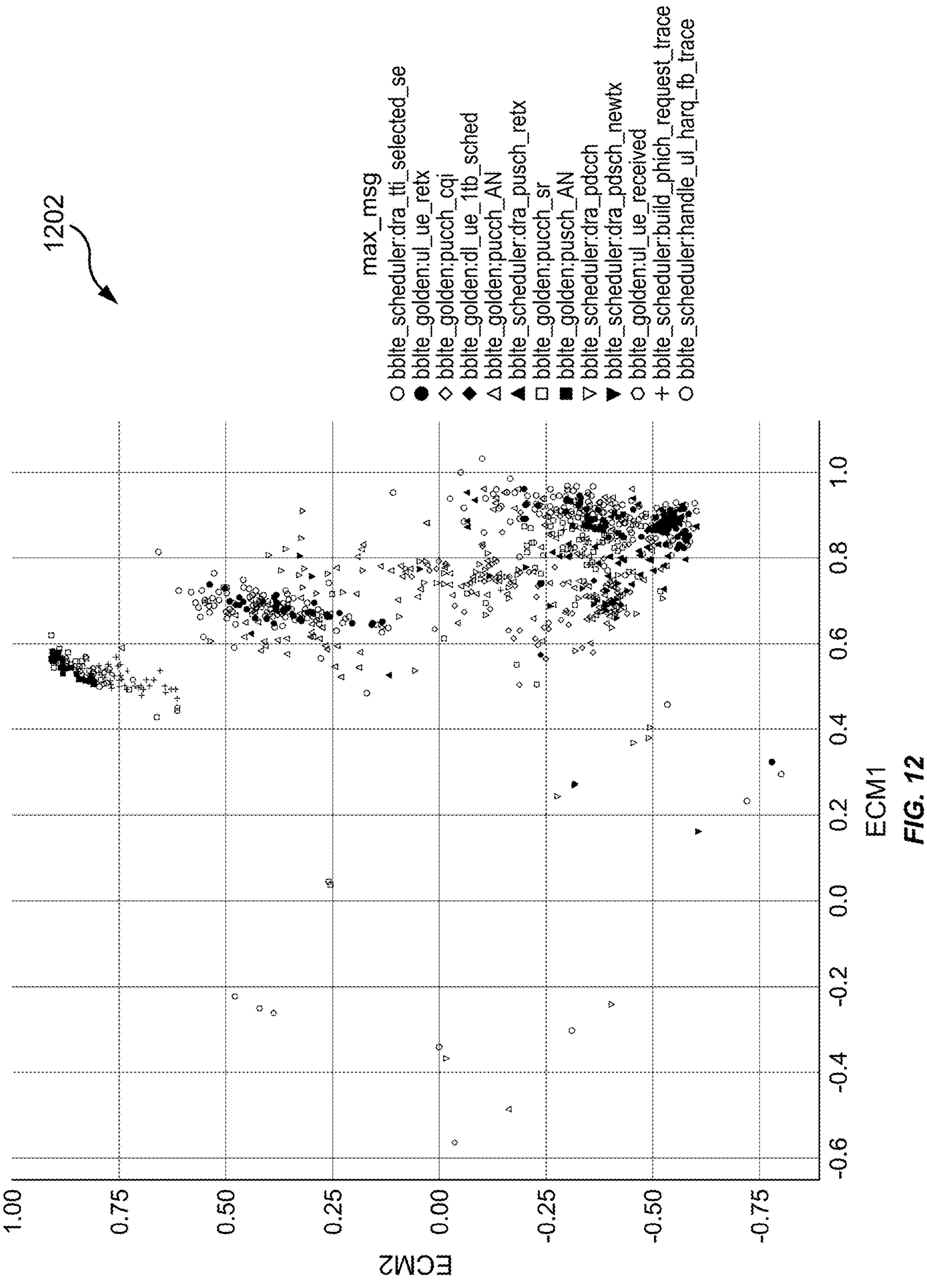
FIG. 12 illustrates an example of activity clustering.

On example of activity clustering is illustrated in FIG. 12. For instance, turning to FIG. 12, the ECM space of top two components is demonstrated in graph 1202. Specifically, the first ECM matrix (ECM1) is illustrated on the X-axis of graph 1202, the second ECM matrix (ECM2) is illustrated on the Y-axis of graph 1202. Each data point in graph 1202 includes, or otherwise represents, a projection of vectorized co-occurrence matrices onto respective ECM components (e.g., eigen vector(s) of profiled normal traffic data). The color for each data point in graph 1202 is for labeling of control message(s) that appeared a maximum number of times in its co-occurrence matrix. Color labeling is used to demonstrate that the ECM space is providing meaningful clusters such that each cluster is representing an activity with unique frequencies of a particular control messages known for that activity.

Additionally, the graph 1202 demonstrates that profile(s) similar to certain activity(s) form their own cluster in the ECM space depending on a share in the training data. Additionally, activity based on messages that appeared maximum number of times can be recognized. For instance, one color cluster is related to uplink UE re-transmission, and a second color cluster is related to scheduler messages.

Figure 13:
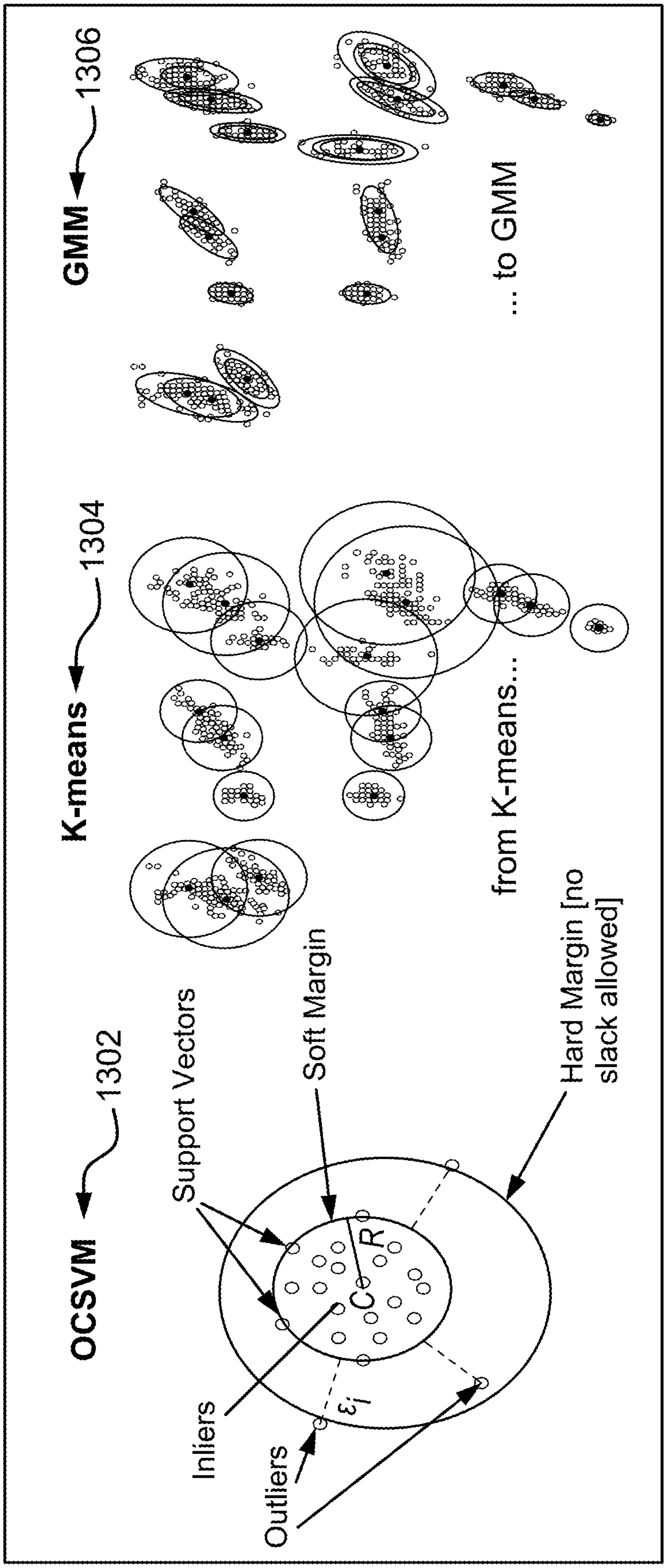
FIG. 13 depicts differences in clustering implementation and efficacy between OCSVM clustering, K-means clustering, and GMM clustering.

Returning to FIG. 4, learning the clusters of activity-based profiles in the ECM space can be performed using various techniques. Specifically, Gaussian Mixture Model (GMM) can be applied as the ML approach. The GMM is an unsupervised soft clustering method and is a general form of K-mean clustering. Generally, GMM models learn spherical boundaries around clusters, and allows for flexibility over shape of clusters. Additionally, GMM facilitates probabilistic mixture for activity learning and classification. However, other solutions also exist. For example, one simpler solution is to learn the global boundary around all of the data using a kernel-based method like One Class SVM (OCSVM). However, by doing so, we cannot capture individual activity clusters in the profiled data. Moreover, it is difficult to detect novel or malicious activities over data distributed among different clusters. FIG. 13 depicts the differences in clustering implementation and efficacy between OCSVM clustering 1302, K-means clustering 1304, and GMM clustering 1306.

Returning to FIG. 4, in phase 406, the GMM machine-learned behavior analysis model is trained on ECM profile data based at least in part on the assumption that each activity being performed in a time window can be expressed as a mixture of M activities learned over traffic data. As discussed previously, in the representation phase 402, the notion of an activity in a form of a co-occurrence matrix can be represented where each recorded element i.e., relative frequency of a co-occurrence pair, becomes part of a co-occurrence pattern characterizing that activity. The co-occurrence pattern uniquely represents activity being repeatedly performed by multiple UE in their lifetimes span over different time windows and sessions. These were profiled by using a profiling method ECM and projected into reduced dimensional ECM space, which provides a global picture of the profiled data that how similar activities come close together in ECM space to form a clustering structure by multiple UEs over their lifetime. A UE, during its lifetime, is generally switching between different activities (states) by changing the cooccurrence pattern to become another activity. Therefore, it is intuitive that each activity can be described as a mixture of other activities.

In some embodiments, the GMM model (e.g., a GMM mixture model, etc.) is included or otherwise utilized for the machine-learned behavior analysis model. The machine-learned behavior analysis model can be a probabilistic generative GMM model that models these activities as a mixture of multivariate Gaussian distribution. Given a trained GMM model on normal traffic data, the log likelihood can be computed for whether the test data has been generated by a "normal" model as a mixture of "normal" activities or it has no support in terms of log likelihood.

Specifically, the log likelihood function over N ECM profiled data points can be represented as:

$$\ell(\theta \mid x) = \sum_{i=1}^{N} \log(g_\theta(x_i))$$

where a $g_\theta(x_i)$ represents a gaussian mixture model density estimated by $f(x_i)$ $$f(x_i) = \sum_{m=1}^{M} \alpha_m \phi\left(x_i \mid \mu_m, \sum_m\right)$$

and the log-likelihood becomes:

$$\ell(\theta \mid x) = \sum_{i=1}^{N} \log\left(\sum_{m=1}^{M} \alpha_m \phi\left(x_i \mid \mu_m, \sum_m\right)\right)$$

where model parameters are represented as:

$$\theta = \left\{\alpha_1, \ldots, \alpha_M, \mu_1, \ldots, \mu_M, \sum_1, \ldots, \sum_M\right\}.$$

Given a trained GMM machine-learned behavior analysis model with parameter θ learned on normal traffic, the likelihood of the query data being generated from the machine-learned behavior analysis model can be computed, which provides a score to classify an activity. For example, if query data consists of log sequences that have been generated by a mixture of normal activities, then the likelihood function for each such activity represented by co-occurrence matrix will give high likelihood function values whereas if it does not explain by any of the normal activity, the likelihood function will take low and negative.

Figure 14:
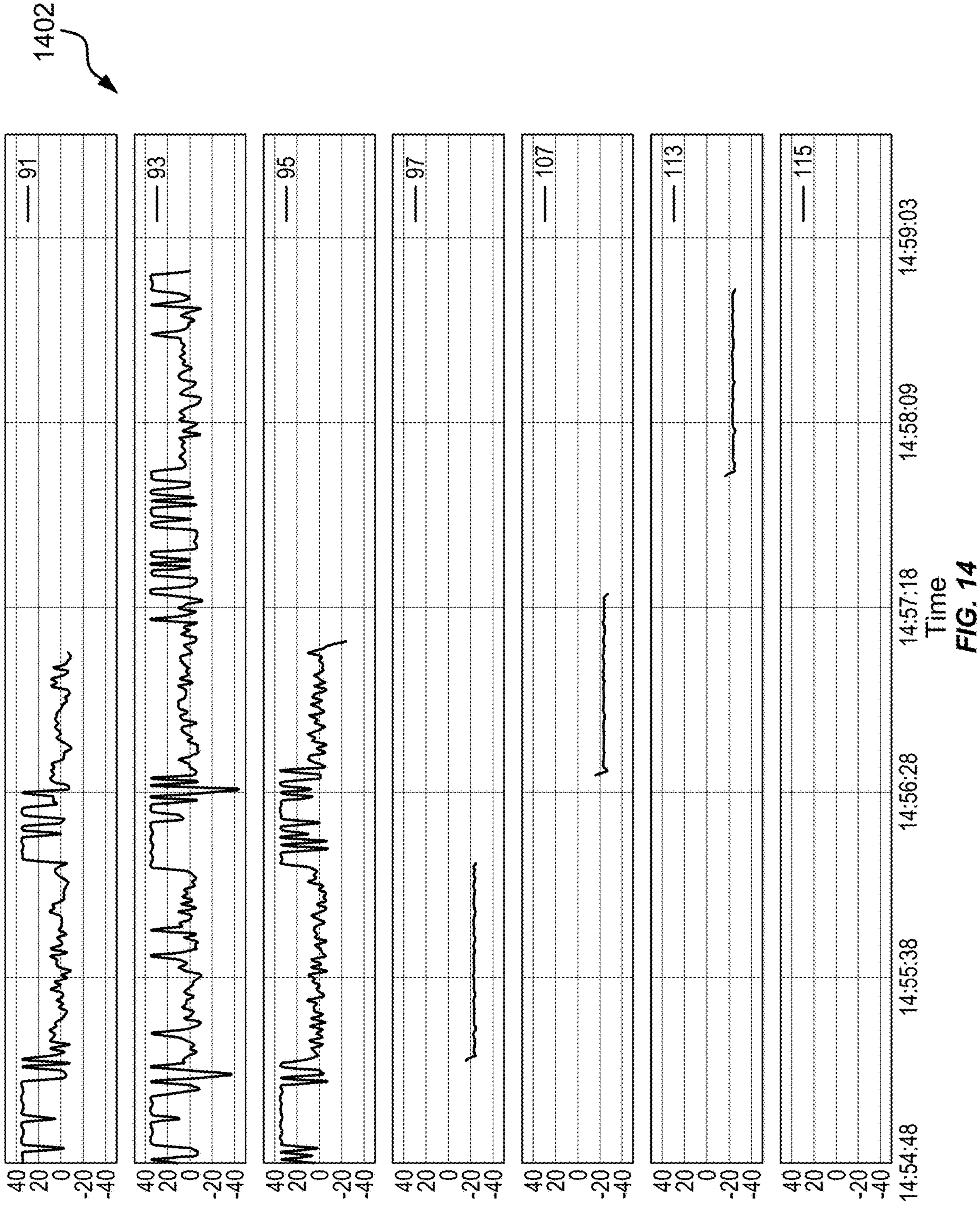
FIG. 14 illustrates a log likelihood time series plot.

A log likelihood time series plot is illustrated with regards to FIG. 14. FIG. 14 illustrates an example log series time plot 1402. The log time series time plot 1402 demonstrates the time series of likelihood for each session (RNTI). The RNTI number 91, 93, and 95 are assigned to normal UE performing normal activities, whereas the RNTI number 97, 107, 113 and 115 are assigned to UE playing the role of compromised/malicious UE. The likelihood function $f(x_i)$ for each session RNTI ID over time in a manually curated simulation where the session ID of normal {91,93,95} and malicious {97,107,113,115} UE are known a priori, and the time of attack episodes are also known a priori.

The time series of log likelihood function provides the profile-based activity classification decision function. For example, the illustrated log time series plot 1402 demonstrates the log likelihood function differentiates the behavior among normal, malicious and victim by high likelihood, near-zero likelihood, and low likelihood function values on time scales, which is accurately aligned with the manually curated attack episodes and also with each RNTI assigned to UEs.

Figure 15:
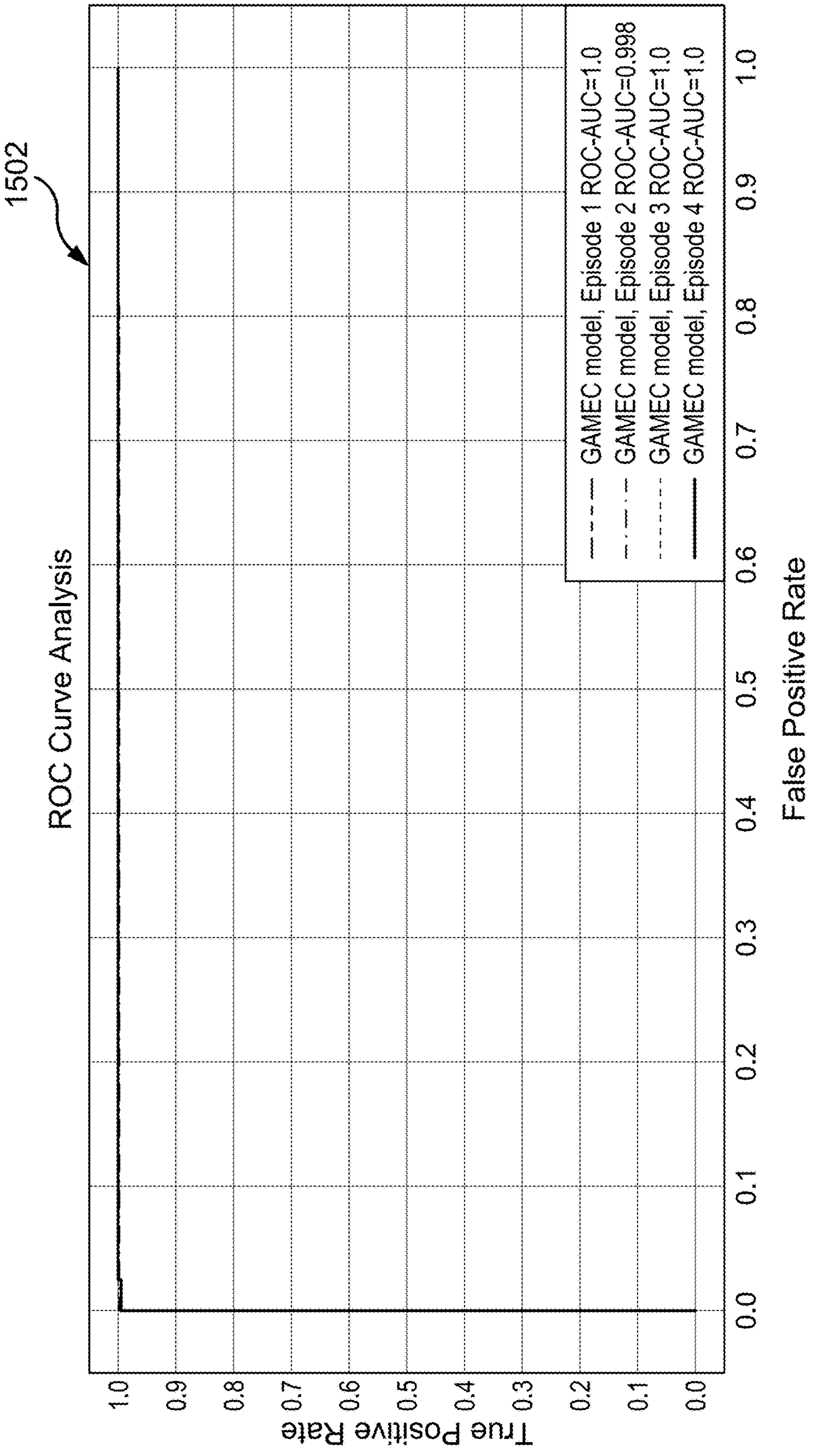
FIG. 15 depicts malicious activity detection accuracy graph for a machine-learned behavior analysis model according to some embodiments of the present disclosure.

FIG. 15 depicts malicious activity detection accuracy graph 1502 for a machine-learned behavior analysis model according to some embodiments of the present disclosure. Specifically, the graph 1502 demonstrates a precision recall curve for a simulation run, where traffic data has been generated by 7 normal UEs and 1 malicious UE to test our pipeline. The data of graph 1502 is manually curated during the simulation run, because the attack episode times and RNTI assigned to a single malicious UE are known. The model utilized for graph 1502 is trained and utilized according to systems and methods of the present disclosure demonstrates a high accuracy of 98% in detecting the malicious activities in 4 attack episodes and with area under the curve of the graph 1502 equals to 99%. The malicious UE runs MAC uplink exhaustion attack, which is high intensity attack and has clear pattern diverging it from normal traffic.

Figure 16:
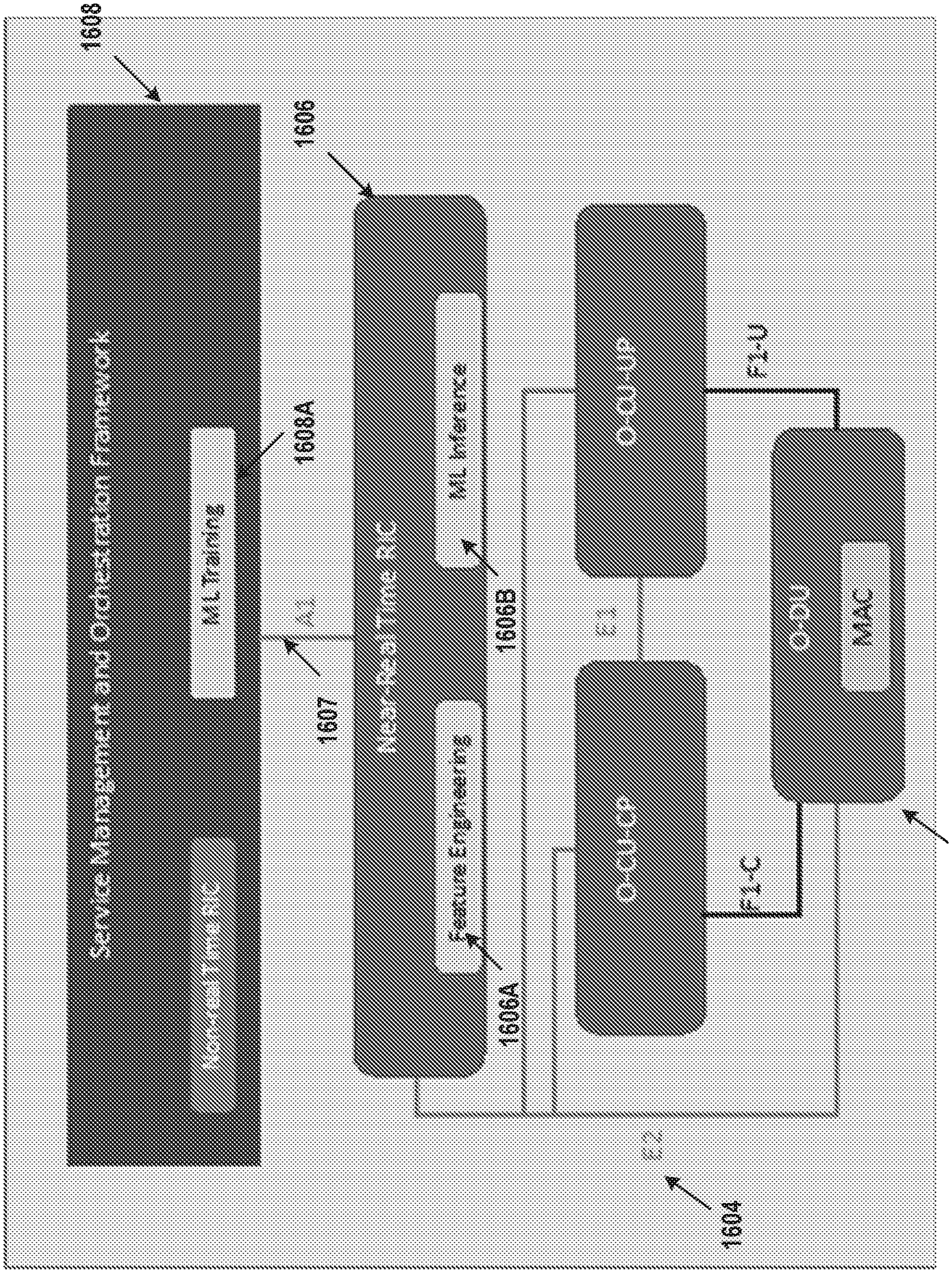
FIG. 16 depicts a data flow diagram for one or more functions of the present disclosure implemented on one or more physical or virtualized devices to some embodiments of the present disclosure.

FIG. 16 depicts a data flow diagram for one or more functions of the present disclosure implemented on one or more physical or virtualized devices to some embodiments of the present disclosure. More specifically, in some embodiments, systems and methods of the present disclosure obtain MAC protocol traces from Open Distributed Unit (O-DU) 1602 via the E2 interface 1604. ML features are extracted in Near-Real Time Ran Intelligent Controller (RIC) 1606 in a feature engineering module 1606A. For ML model training task, the features will be shared with Service Management and Orchestration (SMO) framework 1608 via A1 interface 1607 where ML Training module 1608A will utilize the features for training of the ML model. Since detecting uplink attacks originated from malicious devices, this can be considered a time critical application where requiring the ML inference task, where the features will be used by the ML Inference model 1606B located in the Near-Real Time RIC 1606 for detection of uplink exhaustion attacks.

Figure 17:
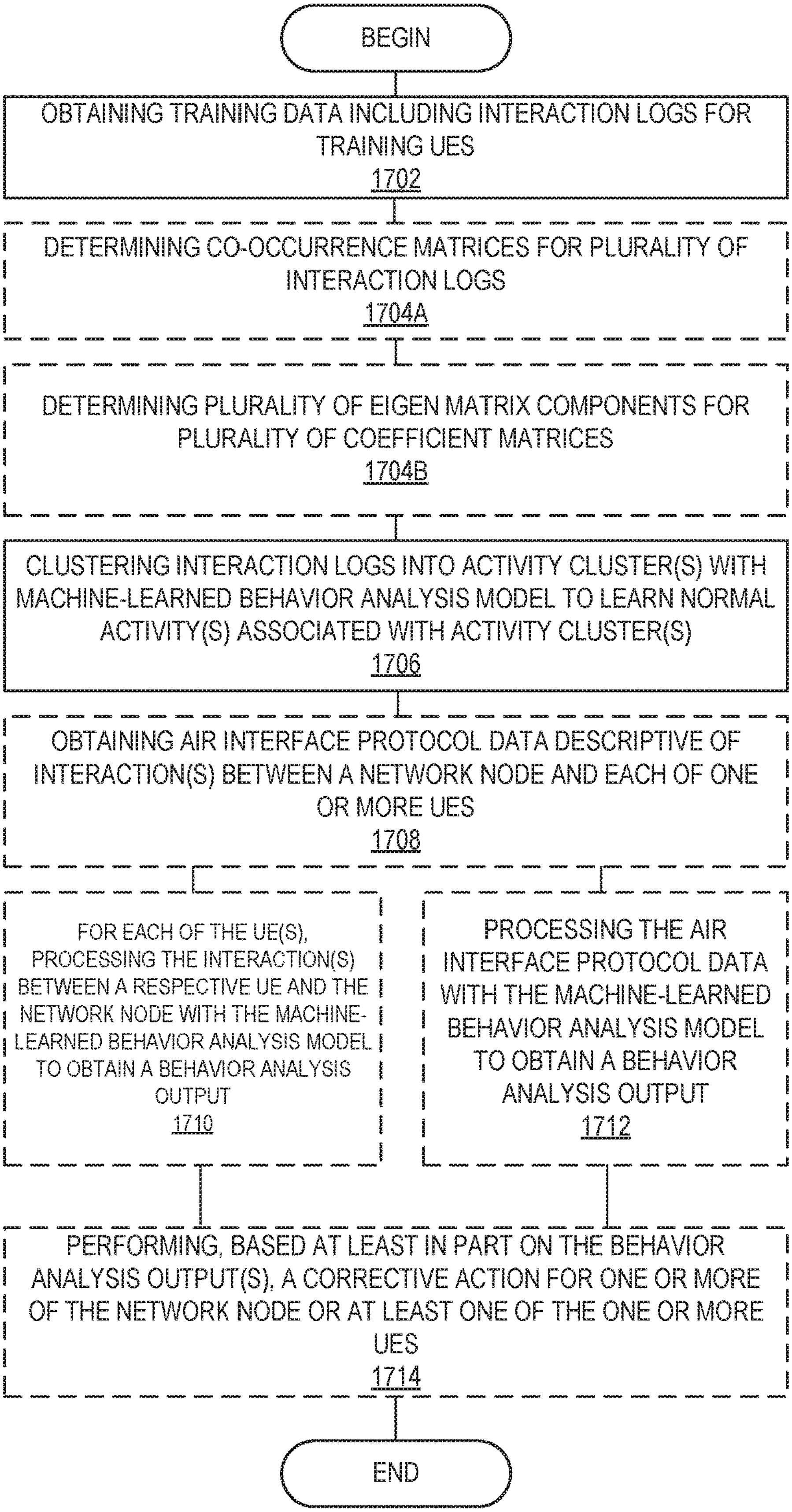
FIG. 17 depicts a data flow diagram for a method performed by a network node for training and/or utilizing a machine-learned behavior analysis model according to some embodiments of the present disclosure.

FIG. 17 depicts a data flow diagram for a method performed by a network node for training and/or utilizing a machine-learned behavior analysis model according to some embodiments of the present disclosure. It should be noted that the steps depicted in FIG. 17 can be performed by, or otherwise executed by, computing node(s) and/or virtualized computing node(s). Note that according to some embodiments, one or more steps in FIG. 17 can be performed, while other steps are optional. Such steps are indicated by a dashed box.

At step 1702, the network node 2000 obtains training data including a plurality of interaction logs for a respective plurality of training UEs. In some embodiments, the training data includes air interface protocol training data. The air interface protocol training data includes the plurality of interaction logs for the respective plurality of training UEs. Each of the plurality of interaction logs is descriptive of one or more normal interactions between the network node 2000 and a respective training UE of the plurality of training UEs. Similarly, in some embodiments, a training UE can be, simulate, or otherwise represent a UE known to exhibit non-malicious behavior. In some embodiments, step 1702 includes at least a portion of phase 402 and/or phase 404 of FIG. 4.

In some embodiments, the one or more normal interactions can describe one or more exchanges of control messages. For example, an interaction log may describe exchanges of control messages between a MAC layer of a UE or training UE and the RAN of a network node (e.g., network node 2000).

At step 1704A, optionally, to obtain the training data of step 1702, the network node 2000 respectively determines a plurality of co-occurrence matrices for the plurality of interaction logs based at least in part on features of a MAC layer of the network node. A co-occurrence matrix is indicative of co-occurrences in interactions between a UE and the network node. In some embodiments, the training data includes the plurality of co-occurrence matrices.

At step 1704B, optionally, to obtain the training data of step 1702, the network node 2000 respectively determines a plurality of eigen matrix components for the plurality of co-occurrence matrices. An eigen matrix component is indicative of a degree of deviation from mean behavior for interactions between a UE and the network node. In some embodiments, the training data includes the plurality of eigen matrix components.

At step 1706, the network node 2000 clusters each of the interaction logs of the training data into one or more activity clusters with a machine-learned behavior analysis model to learn one or more activities associated with at least one of the one or more activity clusters. In some embodiments, each of the one or more activities are associated with unique frequencies of particular types of control messages known for that activity. In some embodiments, step 1706 includes at least a portion of phase 406 of FIG. 4.

At step 1708, optionally, the network node 2000 obtains air interface protocol data descriptive of one or more interactions between a network node and each of one or more UEs. In some embodiments, step 1706 includes at least a portion of phase 406 of FIG. 4.

At step 1710, optionally, for each of the one or more UEs, the network node 2000 processes the one or more interactions between a respective UE and the network node with the machine-learned behavior analysis model to obtain a behavior analysis output. The behavior analysis output is indicative of whether the one or more interactions between the respective UE and the network node deviates from normal behavior. In some embodiments, step 1706 includes at least a portion of phase 406 of FIG. 4.

In some embodiments, the behavior analysis output indicates that the one or more interactions between the respective UE and the network node 2000 deviate from normal behavior. For example, the one or more interactions may be associated with an activity cluster that corresponds to abnormal behavior. For another example, the one or more interactions may not be associated with the one or more activity clusters.

At step 1712, optionally, the network node 2000 processes the air interface protocol data with the machine-learned behavior analysis model to obtain a behavior analysis output indicative of whether network traffic of the network node deviates from behavior. In some embodiments, step 1706 includes at least a portion of phase 406 of FIG. 4.

At step 1714, optionally, the network node 2000 performs, based at least in part on the one or more behavior analysis outputs, a correction action for one or more of the network node or at least one of the one or more UEs.

In some embodiments, the machine-learned behavior model includes a Gaussian Mixture Model (GMM).

In some embodiments, each of the plurality of interaction logs is descriptive of one or more normal interactions between a RAN of the network node and a MAC layer of a respective training UE of the plurality of training UEs.

Figure 18:
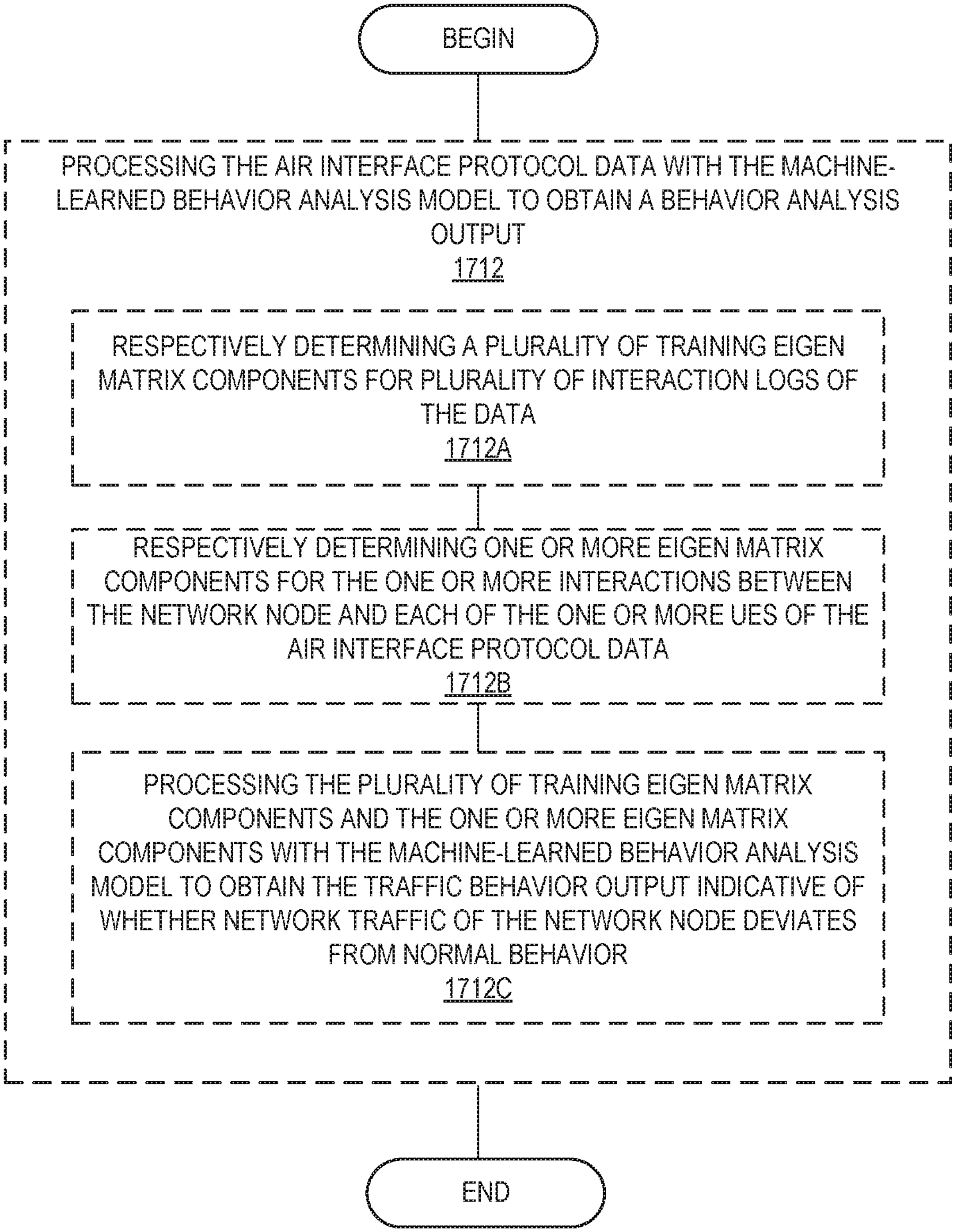
FIG. 18 depicts a data flow diagram for a method performed by a network node for processing air interface protocol data with a machine-learned behavior analysis model according to some embodiments of the present disclosure.

FIG. 18 depicts a data flow diagram for a method performed by a network node for processing air interface protocol data with a machine-learned behavior analysis model according to some embodiments of the present disclosure. It should be noted that the steps depicted in FIG. 18 can be performed by, or otherwise executed by, computing node(s) and/or virtualized computing node(s). Note that according to some embodiments, one or more steps in FIG. 18 can be performed, while other steps are optional. Such steps are indicated by a dashed box.

At step 1712A, optionally, to process the air interface protocol data, the network node 2000 may respectively determine a plurality of training eigen matrix components for plurality of interaction logs of the training data.

At step 1712B, optionally, to process the air interface protocol data, the network node 2000 may respectively determine one or more eigen matrix components for the one or more interactions between the network node and each of the one or more UEs of the air interface protocol data.

At step 1712C, optionally, to process the air interface protocol data, the network node 2000 may process the plurality of training eigen matrix components and the one or more eigen matrix components with the machine-learned behavior analysis model to obtain the traffic behavior output. The traffic behavior output can be indicative of whether network traffic of the network node deviates from normal behavior.

Figure 19:
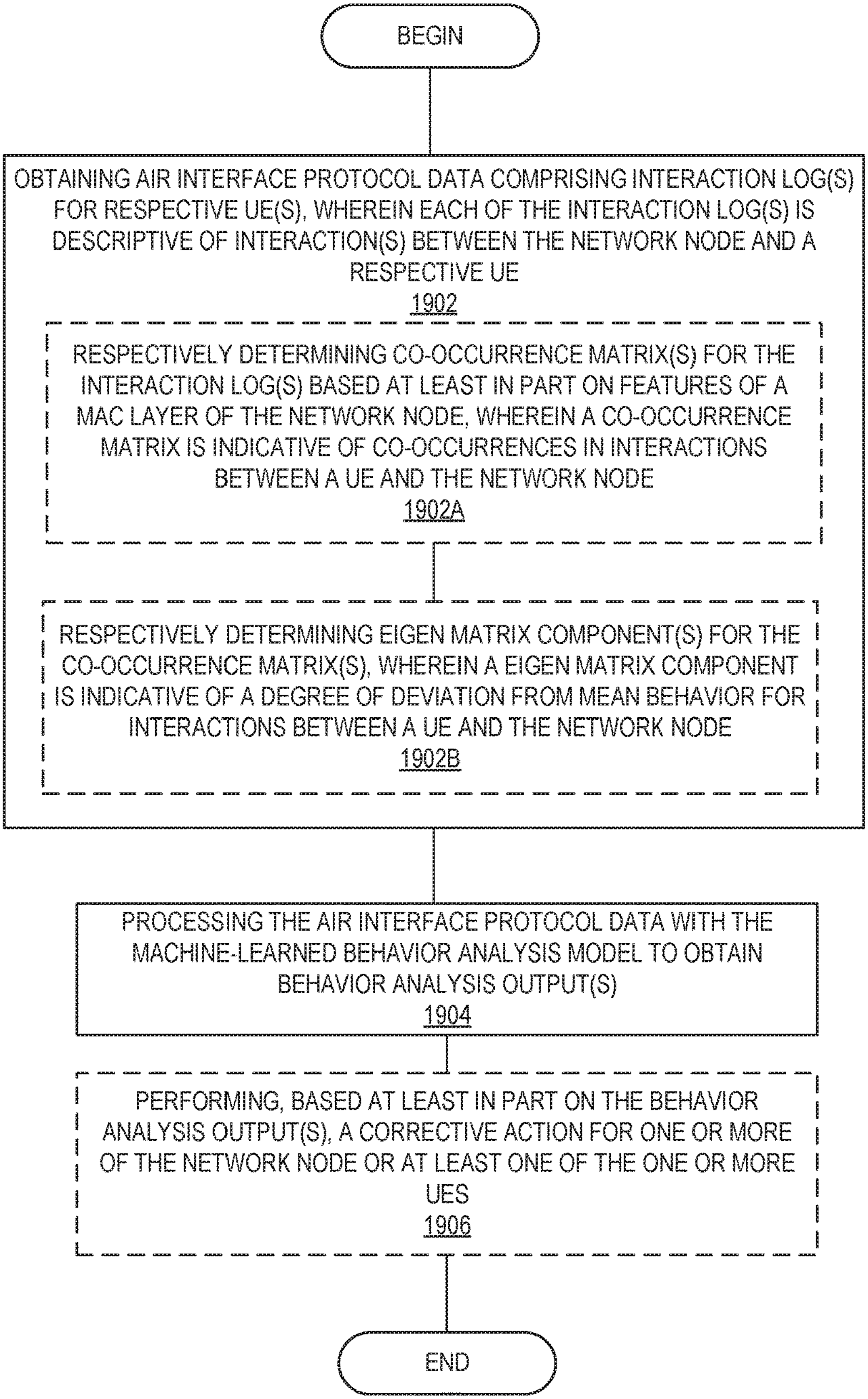
FIG. 19 depicts a data flow diagram for a method performed by a network node utilization of a machine-learned behavior analysis model for abnormal behavior detection according to some embodiments of the present disclosure.

FIG. 19 depicts a data flow diagram for a method performed by a network node utilization of a machine-learned behavior analysis model for abnormal behavior detection according to some embodiments of the present disclosure. It should be noted that the steps depicted in FIG. 19 can be performed by, or otherwise executed by, computing node(s) and/or virtualized computing node(s). Note that according to some embodiments, one or more steps in FIG. 19 can be performed, while other steps are optional. Such steps are indicated by a dashed box.

At step 1902, a network node 2000 obtains air interface protocol data comprising one or more interaction logs for one or more respective UEs. Each of the one or more interaction logs is descriptive of one or more interactions between the network node (2000) and a respective UE of the one or more UEs.

At step 1902A, optionally, to obtain the air interface protocol data at step 1902, the network node 2000 can respectively determine one or more co-occurrence matrices for the one or more interaction logs based at least in part on features of a MAC layer of the network node. A co-occurrence matrix is indicative of co-occurrences in interactions between a UE and the network node.

At step 1902B, optionally, to obtain the air interface protocol data at step 1902, the network node 2000 can respectively determine one or more eigen matrix components for the one or more interactions between the network node and each of the one or more UEs of the air interface protocol data. In some embodiments, each of the one or more interaction logs is descriptive of one or more interactions between a RAN of the network node and a MAC layer of a respective UE of the one or more UEs.

At step 1904, the network node 2000 processes the air interface protocol data with a machine-learned behavior analysis model to obtain one or more behavior analysis outputs. The machine-learned behavior analysis model is trained based at least in part on training data descriptive of normal interactions between UEs and the network node. In some embodiments, processing the air interface protocol data with the machine-learned behavior analysis model at step 1904 includes processing the one or more eigen matrix components with the machine-learned behavior analysis model to obtain the one or more behavior analysis outputs. In some embodiments, the machine-learned behavior analysis model is or otherwise includes a GMM.

In some embodiments, the one or more behavior analysis outputs include at least one of, for each of the one or more UEs, a UE behavior output indicative of whether the one or more interactions between a respective UE and the network node deviate from normal behavior, or a traffic behavior output indicative of whether network traffic of the network node deviates from normal behavior.

At step 1906, optionally, the network node 2000 performs, based at least in part on the one or more behavior analysis outputs, a corrective action for one or more of the network node or at least one of the one or more UEs.

Figure 20:
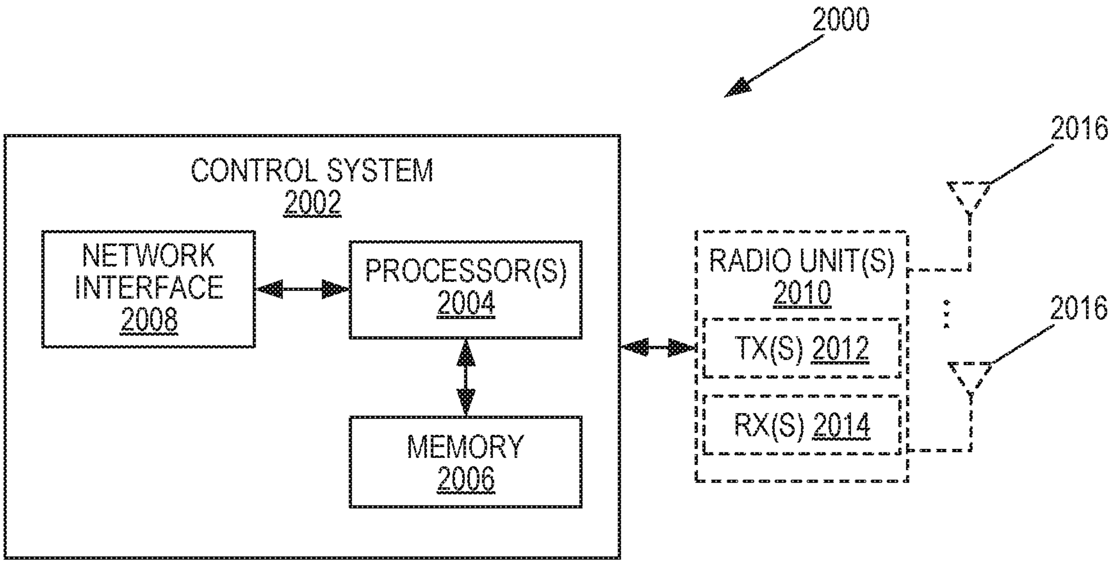
FIG. 20 is a schematic block diagram of a network node according to some embodiments of the present disclosure.

FIG. 20 is a schematic block diagram of a network node 2000 according to some embodiments of the present disclosure. Optional features are represented by dashed boxes. The network node 2000 may be, for example, a base station 102 or 106 or a network node that implements all or part of the functionality of the base station 102 or gNB described herein. As illustrated, the network node 2000 includes a control system 2002 that includes one or more processors 2004 (e.g., Central Processing Units (CPUs), Application Specific Integrated Circuits (ASICs), Field Programmable Gate Arrays (FPGAs), and/or the like), memory 2006, and a network interface 2008. The one or more processors 2004 are also referred to herein as processing circuitry. In addition, the network node 2000 may include one or more radio units 2010 that each includes one or more transmitters 2012 and one or more receivers 2014 coupled to one or more antennas 2016. The radio units 2010 may be referred to or be part of radio interface circuitry. In some embodiments, the radio unit(s) 2010 is external to the control system 2002 and connected to the control system 2002 via, e.g., a wired connection (e.g., an optical cable). However, in some other embodiments, the radio unit(s) 2010 and potentially the antenna(s) 2016 are integrated together with the control system 2002. The one or more processors 2004 operate to provide one or more functions of a network node 2000 as described herein. In some embodiments, the function(s) are implemented in software that is stored, e.g., in the memory 2006 and executed by the one or more processors 2004.

Figure 21:
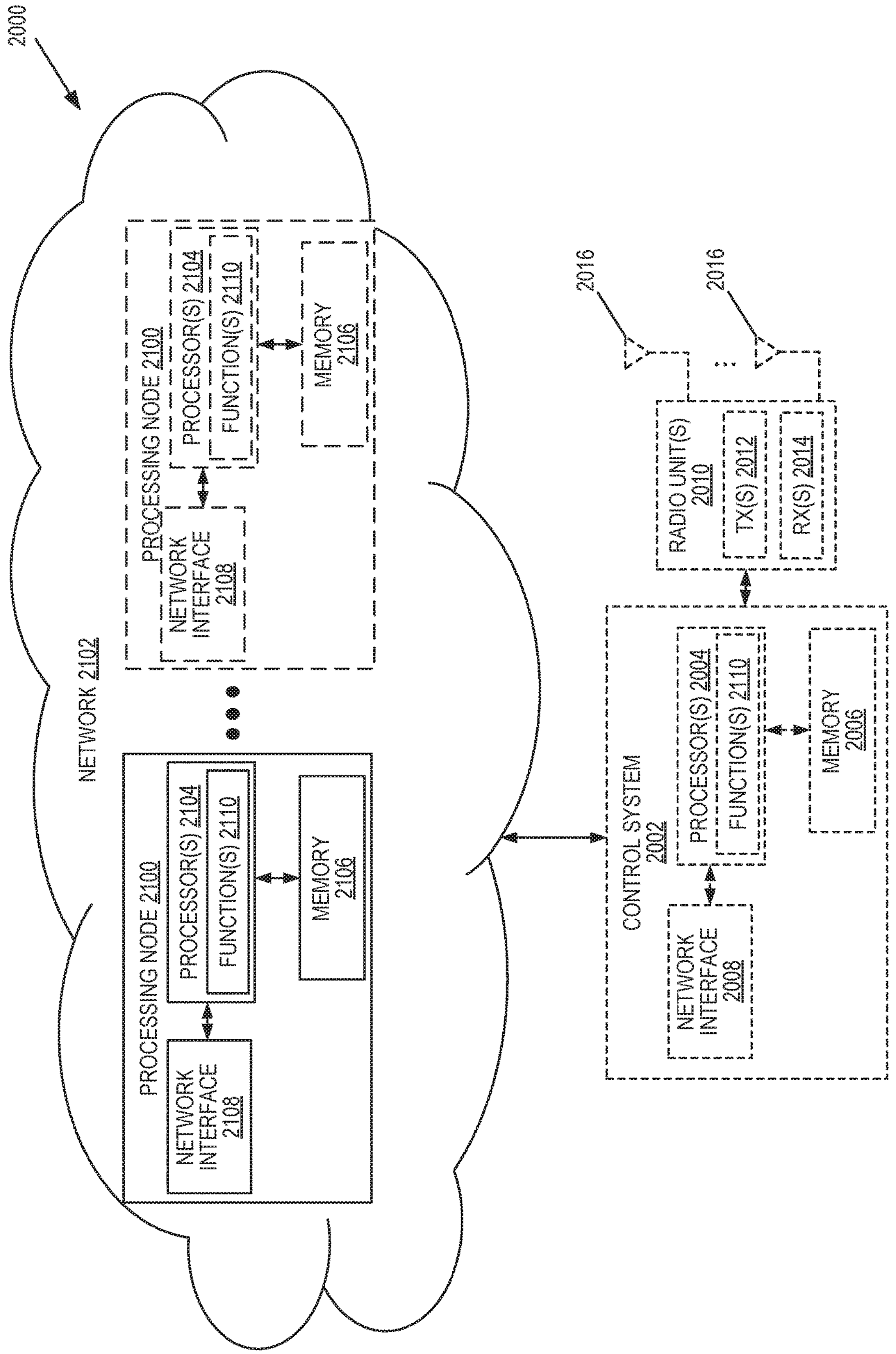
FIG. 21 is a schematic block diagram that illustrates a virtualized embodiment of the network node according to some embodiments of the present disclosure.

FIG. 21 is a schematic block diagram that illustrates a virtualized embodiment of the network node 2000 according to some embodiments of the present disclosure. This discussion is equally applicable to other types of network nodes. Further, other types of network nodes may have similar virtualized architectures. Again, optional features are represented by dashed boxes.

As used herein, a "virtualized" network node is an implementation of the network node 2000 in which at least a portion of the functionality of the network node 2000 is implemented as a virtual component(s) (e.g., via a virtual machine(s) executing on a physical processing node(s) in a network(s)). As illustrated, in this example, the network node 2000 may include the control system 2002 and/or the one or more radio units 2010, as described above. The control system 2002 may be connected to the radio unit(s) 2010 via, for example, an optical cable or the like. The network node 2000 includes one or more processing nodes 2100 coupled to or included as part of a network(s) 2102. If present, the control system 2002 or the radio unit(s) are connected to the processing node(s) 2100 via the network 2102. Each processing node 2100 includes one or more processors 2104 (e.g., CPUs, ASICs, FPGAs, and/or the like), memory 2106, and a network interface 2108.

In this example, functions 2110 of the network node 2000 described herein are implemented at the one or more processing nodes 2100 or distributed across the one or more processing nodes 2100 and the control system 2002 and/or the radio unit(s) 2010 in any desired manner. In some particular embodiments, some or all of the functions 2110 of the network node 2000 described herein are implemented as virtual components executed by one or more virtual machines implemented in a virtual environment(s) hosted by the processing node(s) 2100. As will be appreciated by one of ordinary skill in the art, additional signaling or communication between the processing node(s) 2100 and the control system 2002 is used in order to carry out at least some of the desired functions 2110. Notably, in some embodiments, the control system 2002 may not be included, in which case the radio unit(s) 2010 communicate directly with the processing node(s) 2100 via an appropriate network interface(s).

In some embodiments, a computer program including instructions which, when executed by at least one processor, causes the at least one processor to carry out the functionality of network node 2000 or a node (e.g., a processing node 2100) implementing one or more of the functions 2110 of the network node 2000 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 22:
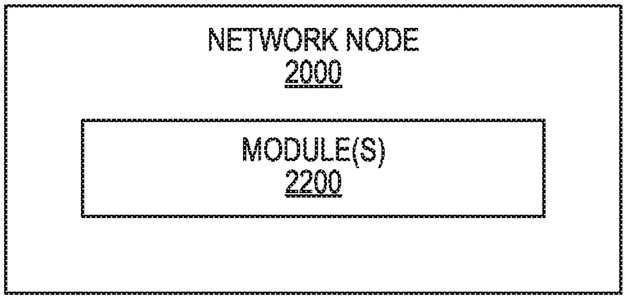
FIG. 22 is a schematic block diagram of the network node according to some other embodiments of the present disclosure.

FIG. 22 is a schematic block diagram of the network node 2000 according to some other embodiments of the present disclosure. The network node 2000 includes one or more modules 2200, each of which is implemented in software. The module(s) 2200 provide the functionality of the network node 2000 described herein. This discussion is equally applicable to the processing node 2100 of FIG. 21 where the modules 2200 may be implemented at one of the processing nodes 2100 or distributed across multiple processing nodes 2100 and/or distributed across the processing node(s) 2100 and the control system 2002.

Figure 23:
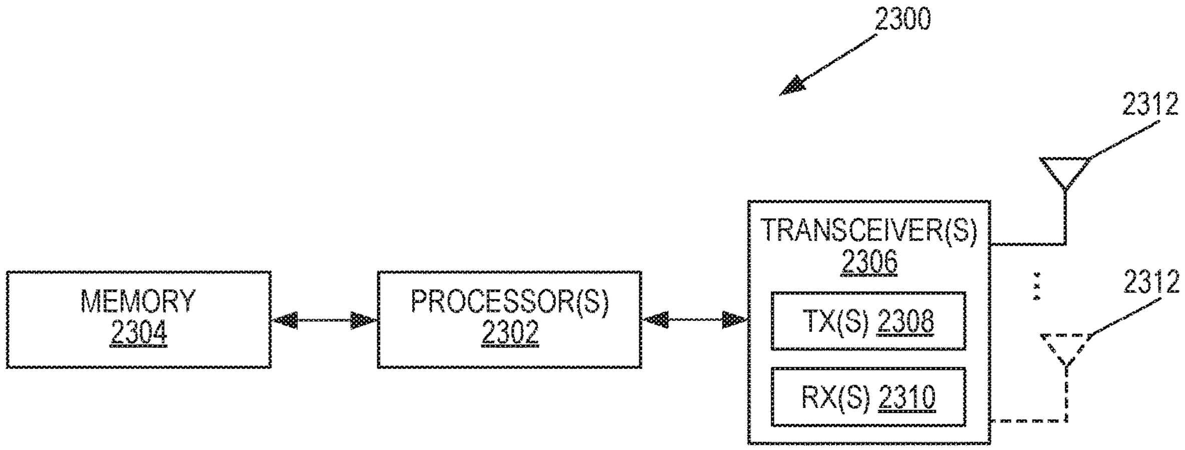
FIG. 23 is a schematic block diagram of a wireless communication device according to some embodiments of the present disclosure.

FIG. 23 is a schematic block diagram of a wireless communication device 2300 according to some embodiments of the present disclosure. As illustrated, the wireless communication device 2300 includes one or more processors 2302 (e.g., CPUs, ASICs, FPGAS, and/or the like), memory 2304, and one or more transceivers 2306 each including one or more transmitters 2308 and one or more receivers 2310 coupled to one or more antennas 2312. The transceiver(s) 2306 includes radio-front end circuitry connected to the antenna(s) 2312 that is configured to condition signals communicated between the antenna(s) 2312 and the processor(s) 2302, as will be appreciated by on of ordinary skill in the art. The processors 2302 are also referred to herein as processing circuitry. The transceivers 2306 are also referred to herein as radio circuitry. In some embodiments, the functionality of the wireless communication device 2300 described above may be fully or partially implemented in software that is, e.g., stored in the memory 2304 and executed by the processor(s) 2302. Note that the wireless communication device 2300 may include additional components not illustrated in FIG. 23 such as, e.g., one or more user interface components (e.g., an input/output interface including a display, buttons, a touch screen, a microphone, a speaker(s), and/or the like and/or any other components for allowing input of information into the wireless communication device 2300 and/or allowing output of information from the wireless communication device 2300), a power supply (e.g., a battery and associated power circuitry), etc.

In some embodiments, a computer program including instructions which, when executed by at least one processor, causes the at least one processor to carry out the functionality of the wireless communication device 2300 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 24:
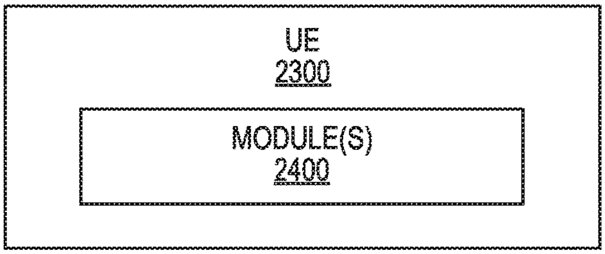
FIG. 24 is a schematic block diagram of the wireless communication device according to some other embodiments of the present disclosure.

FIG. 24 is a schematic block diagram of the wireless communication device 2300 according to some other embodiments of the present disclosure. The wireless communication device 2300 includes one or more modules 2400, each of which is implemented in software. The module(s) 2400 provide the functionality of the wireless communication device 2300 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

The invention claimed is:

1. A method performed by a network node for training of machine-learned models for detection of abnormal user equipment (UE) behavior, wherein the method comprises:
- obtaining training data, wherein obtaining the training data comprises obtaining a plurality of interaction logs for a respective plurality of UEs comprising a first UE; and
- clustering each of the interaction logs of the training data into one or more activity clusters with a machine-learned behavior analysis model to learn one or more activities associated with at least one of the one or more activity clusters, wherein
- the plurality of interaction logs comprises a first interaction log for the first UE, and
- the first interaction log for the first UE comprises time series data indicating medium access control (MAC) layer messages transmitted by the first UE within a first window of time.

2. The method of claim 1, wherein
- obtaining the training data further comprises: respectively determining a plurality of co-occurrence matrices for the plurality of interaction logs based at least in part on features of a MAC layer of the network node, wherein a co-occurrence matrix is indicative of co-occurrences in interactions between a UE and the network node, and
- the training data comprises the plurality of co-occurrence matrices.

3. The method of claim 1, wherein
- obtaining the training data further comprises:
  - respectively determining a plurality of co-occurrence matrices for the plurality of interaction logs based at least in part on features of a MAC layer of the network node; and
  - respectively determining a plurality of eigen matrix components for the plurality of co-occurrence matrices, wherein an eigen matrix component is indicative of a degree of deviation from mean behavior for interactions between a UE and the network node, and
- the training data comprises the plurality of eigen matrix components.

4. The method of claim 1, wherein
- the MAC layer messages comprise MAC layer control messages.

5. The method of claim 1, wherein:
- each of the one or more activities is associated with unique frequencies of particular types of control messages known for that activity.

6. The method of claim 1, wherein
- obtaining the plurality of interaction logs comprises obtaining air interface protocol data descriptive of one or more interactions between a network node and each of one or more UEs.

7. The method of claim 6, wherein the method further comprises:
- for each of the one or more UEs, processing the one or more interactions between a respective UE and the network node with the machine-learned behavior analysis model to obtain a behavior analysis output indicative of whether the one or more interactions between the respective UE and the network node deviates from normal behavior.

8. The method of claim 7, wherein:
- the behavior analysis output indicates that the one or more interactions between the respective UE and the network node deviates from normal behavior; and
- the one or more interactions between the respective UE and the network node are not associated with at least one of the one or more activity clusters.

9. The method of claim 6, wherein the method further comprises:
- processing the air interface protocol data with the machine-learned behavior analysis model to obtain a behavior analysis output indicative of whether network traffic of the network node deviates from behavior.

10. The method of claim 9, wherein processing the air interface protocol data with the machine-learned behavior analysis model to obtain the traffic behavior output comprises one or more of:

respectively determining a plurality of training eigen matrix components for plurality of interaction logs of the training data;

respectively determining one or more eigen matrix components for the one or more interactions between the network node and each of the one or more UEs of the air interface protocol data; and processing the plurality of training eigen matrix components and the one or more eigen matrix components with the machine-learned behavior analysis model to obtain the traffic behavior output indicative of whether network traffic of the network node deviates from normal behavior.

11. The method of claim 7, wherein the method further comprises:

performing, based at least in part on the one or more behavior analysis outputs, a corrective action for one or more of the network node or at least one of the one or more UEs.

12. The method of claim 1, wherein the machine-learned behavior analysis model comprises a Gaussian Mixture Model, GMM.

13. A network node, the network node comprising:

memory; and processing circuitry, wherein the network node is configured to perform a method for training of machine-learned models for detection of abnormal user equipment (UE) behavior, the method comprising:

obtaining training data, wherein obtaining the training data comprises obtaining a plurality of interaction logs for a respective plurality of UEs comprising a first UE; and clustering each of the interaction logs of the training data into one or more activity clusters with a machine-learned behavior analysis model to learn one or more activities associated with at least one of the one or more activity clusters, wherein the plurality of interaction logs comprises a first interaction log for the first UE, and the first interaction log for the first UE comprises time series data indicating medium access control (MAC) layer message transmitted by the first UE within a first window of time.

14. A network node the network node comprising:

memory; and processing circuitry, wherein the network node is configured to perform a method for machine-learned detection of abnormal user equipment (UE) behavior, the method comprising:

obtaining air interface protocol data comprising one or more interaction logs for one or more respective UEs, wherein the one or more interaction logs comprises a first interaction log for a first UE, and the first interaction log for the first UE comprises time series data indicating medium access control (MAC) layer messages transmitted by the first UE within a first window of time; and processing the air interface protocol data with a machine-learned behavior analysis model to obtain one or more behavior analysis outputs, wherein the machine-learned behavior analysis model is trained based at least in part on training data descriptive of normal interactions between UEs and the network node.

15. The network node of claim 14, wherein obtaining the air interface protocol data comprising the one or more interaction logs for the one or more respective UEs further comprises:

respectively determining one or more co-occurrence matrices for the one or more interaction logs based at least in part on features of a MAC layer of the network node, wherein a co-occurrence matrix is indicative of co-occurrences in interactions between a UE and the network node; and respectively determining one or more eigen matrix components for the one or more co-occurrence matrices, wherein an eigen matrix component is indicative of a degree of deviation from mean behavior for interactions between a UE and the network node; and wherein processing the air interface protocol data with the machine-learned behavior analysis model comprises processing the one or more eigen matrix components with the machine-learned behavior analysis model to obtain the one or more behavior analysis outputs.

16. The network node of claim 14, wherein the one or more behavior analysis outputs comprise at least one of:

for each of the one or more UEs, a UE behavior output indicative of whether the one or more interactions between a respective UE and the network node deviate from normal behavior; or a traffic behavior output indicative of whether network traffic of the network node deviates from normal behavior.

17. The network node of claim 16, wherein the one or more operations further comprise performing, based at least in part on the one or more behavior analysis outputs, a corrective action for one or more of the network node or at least one of the one or more UEs.

18. The network node of claim 14, wherein each of the one or more interaction logs is descriptive of one or more interactions between a Radio Access Network, RAN, of the network node and a MAC layer of a respective UE of the one or more UEs.

* * * * *